(12) United States Patent
Kwon et al.

(10) Patent No.: US 12,272,352 B2
(45) Date of Patent: Apr. 8, 2025

(54) ELECTRONIC DEVICE AND METHOD FOR PERFORMING VOICE RECOGNITION THEREOF

(71) Applicant: SAMSUNG ELECTRONICS CO., LTD., Suwon-si (KR)

(72) Inventors: Ojun Kwon, Suwon-si (KR); Hyunjin Park, Suwon-si (KR); Kiyong Lee, Suwon-si (KR); Yoonju Lee, Suwon-si (KR); Jisup Lee, Suwon-si (KR); Jaeyung Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 17/516,045

(22) Filed: Nov. 1, 2021

(65) Prior Publication Data

US 2022/0130377 A1   Apr. 28, 2022

Related U.S. Application Data

(63) Continuation of application No. PCT/KR2021/015187, filed on Oct. 27, 2021.

(30) Foreign Application Priority Data

Oct. 27, 2020   (KR) .......................... 10-2020-0140539

(51) Int. Cl.
*G10L 15/18*   (2013.01)
*G10L 13/02*   (2013.01)
*H04L 67/125*  (2022.01)

(52) U.S. Cl.
CPC .............. *G10L 15/18* (2013.01); *G10L 13/02* (2013.01); *H04L 67/125* (2013.01)

(58) Field of Classification Search
CPC ........ G10L 15/18; G10L 13/02; H04L 67/125
See application file for complete search history.

(56) References Cited

U.S. PATENT DOCUMENTS

2002/0091527 A1* 7/2002 Shiau ..................... G10L 15/30
                                                                 704/E15.047
2012/0265528 A1* 10/2012 Gruber .................. G10L 15/183
                                                                 704/235

(Continued)

FOREIGN PATENT DOCUMENTS

KR   10-2019-0023341   3/2019
KR   10-2020-0016774   2/2020

(Continued)

OTHER PUBLICATIONS

Search Report and Written Opinion issued Feb. 3, 2022 in counterpart International Patent Application No. PCT/KR2021/015187.

*Primary Examiner* — Pierre Louis Desir
*Assistant Examiner* — Daniel W Chung
(74) *Attorney, Agent, or Firm* — Nixon & Vanderhye, P.C.

(57) ABSTRACT

Various embodiments relate to an electronic device and a voice recognition performing method of an electronic device which are capable of receiving a voice input of a user and executing a function corresponding to a user command generated by the voice input. An electronic device according to various embodiments may include: a communication circuitry, a microphone, a display, and a processor, wherein the processor may be configured to: receive a voice utterance through the microphone, perform speech recognition on the received voice using a natural language platform for processing a command, determine whether to process the command based on an interaction with a server while performing the speech recognition, generate intermediate data corresponding to a state in which the speech recognition (Continued)

is performed based on determining processing based on the interaction with the server, control the communication circuitry to transmit the intermediate data to the server, receive a processing result of processing the command from the server based on the intermediate data, and control the display to display the processing result.

17 Claims, 21 Drawing Sheets

(56) References Cited

U.S. PATENT DOCUMENTS

| | | | | |
|---|---|---|---|---|
| 2012/0316878 | A1* | 12/2012 | Singleton | G10L 15/08 704/E15.005 |
| 2013/0151250 | A1* | 6/2013 | VanBlon | G10L 15/30 704/235 |
| 2015/0262571 | A1* | 9/2015 | Kaszczuk | G10L 13/04 704/260 |
| 2016/0042748 | A1 | 2/2016 | Jain et al. | |
| 2016/0260430 | A1 | 9/2016 | Panemangalore et al. | |
| 2018/0197545 | A1* | 7/2018 | Willett | G10L 15/005 |
| 2019/0066674 | A1 | 2/2019 | Jaygarl et al. | |
| 2020/0051555 | A1 | 2/2020 | Jaygarl et al. | |
| 2020/0051560 | A1 | 2/2020 | Yi et al. | |
| 2020/0265840 | A1 | 8/2020 | Kwon et al. | |
| 2020/0286477 | A1 | 9/2020 | Jaygarl et al. | |
| 2021/0090555 | A1* | 3/2021 | Mahmood | G10L 13/033 |

FOREIGN PATENT DOCUMENTS

| | | |
|---|---|---|
| KR | 10-2020-0017293 | 2/2020 |
| KR | 10-2020-0087497 | 7/2020 |
| KR | 10-2020-0101103 | 8/2020 |

* cited by examiner

ELECTRONIC DEVICE AND METHOD FOR PERFORMING VOICE RECOGNITION THEREOF

CROSS-REFERENCE TO RELATED APPLICATIONS

This application is a continuation of International Application No. PCT/KR2021/015187 designating the United States, filed on Oct. 27, 2021, in the Korean Intellectual Property Receiving Office and claiming priority to Korean Patent Application No. 10-2020-0140539, filed on Oct. 27, 2020, in the Korean Intellectual Property Office, the disclosures of which are incorporated by reference herein in their entireties.

BACKGROUND

Field

The disclosure relates to an electronic device and a voice recognition performing method of an electronic device which are capable of receiving a voice input of a user and executing a function corresponding to a user command generated by the voice input.

Description of Related Art

With the advancement of digital technology, various types of electronic devices, such as a personal digital assistant (PDA), a smartphone, a tablet personal computer (PC), and a wearable device, are widely used. In order to support and improve the functions of electronic devices, electronic devices are continuously being developed in the aspect of hardware and/or software.

Electronic devices can implement various functions in addition to a call function and provide various input interfaces to allow users to use various functions. For example, an input interface of an electronic device provides a voice input method evolving from a button input method or a touch screen-based touch input method. For example, an electronic device may control the execution of an application through a user's voice command or may perform a function employing a web-based service using a voice recognition or speech recognition technology. The speech recognition technology may be a technology of understanding a speech uttered by a user (e.g., a human being) and converting the speech into code information that can be handled by an electronic device. For example, the speech recognition technology may include a processing operation of inputting a speech waveform, identifying a word or a sequence of words, and extracting a meaning.

Current voice recognition technology proposes a method in which a command entailing simple computational processing is processed in an electronic device and a command that cannot be processed by the electronic device (e.g., a command entailing complex computational processing and requiring a large quantity of resources) is processed using a server (e.g., an intelligent server). For example, in a conventional art, when an electronic device first processes a user command (e.g., an input voice) but fails to process the user command, the electronic device may transmit the user command to a server so that the user command may be processed by the server. However, in the conventional art, when the electronic device fails to process the command, the server starts processing the command again from the beginning. Therefore, in the conventional art, since the server performs all operations for processing the command again from the beginning when the electronic device fails to process the command, the response time of the server may be increased and, as a result, a user may experience inconvenience due to a delay of the response time of the server.

SUMMARY

Embodiments of the disclosure provide a method and a device capable of minimizing and/or reducing response time for processing a user command when an electronic device provides an intelligent service (e.g., an intelligent assistant or intelligent personal assistant service).

Embodiments of the disclosure provide a method and a device capable of processing voice recognition and/or command generation operations in a distributed manner between an electronic device and a server when the electronic device provides an intelligent service.

Embodiments of the disclosure provide a method and a device capable of providing intermediate data processed in an electronic device to a server to enable continuous operation processing following an operation performed in the electronic device and providing a rapid response due to continuous operation processing when the electronic device and the server process a user command in a distributed manner.

Embodiments of the disclosure provide a method and a device capable of processing a user command by each module for processing a user command when an electronic device and a server process the user command in a distributed manner by an interaction.

An electronic device according to an example embodiment of the disclosure may include: a communication circuitry, a microphone, a display, and a processor operatively connected to the communication circuitry, the microphone, and the display, wherein the processor may be configured to: receive a voice utterance through the microphone, perform speech recognition on the received voice using a natural language platform for processing a command, determine whether to process the command, based on an interaction with a server while performing the speech recognition, generate intermediate data corresponding to a state in which the speech recognition is performed based on determining processing based on the interaction with the server, control the communication circuitry to transmit the intermediate data to the server, receive a processing result of processing the command from the server based on the intermediate data, and control the display to display the processing result.

A method of operating an electronic device according to an example embodiment of the disclosure may include: receiving a voice utterance through a microphone, performing speech recognition on the received voice using a natural language platform for processing a command, determining whether to process the command, based on an interaction with a server while performing the speech recognition, generating intermediate data corresponding to a state in which the speech recognition is performed based on determining processing based on the interaction with the server, transmitting the intermediate data to the server through a communication circuitry, receiving a processing result of processing the command from the server based on the intermediate data, and displaying the processing result through a display.

To address the foregoing problem, various example embodiments of the disclosure may include a non-transitory computer-readable recording medium that records a program for a processor to execute the method.

Additional scope of applicability of the disclosure will be apparent from the following detailed description. However, since various changes and modifications within the spirit and scope of the disclosure may be clearly understood by those skilled in the art, it should be understood that the detailed description and specific embodiments, such as various example embodiments, of the disclosure are presented simply by way of non-limiting illustration.

Using an electronic device and an operating method thereof according to various example embodiments, it is possible to reduce additional response time when the electronic device interacts with a server for an intelligent service. According to various example embodiments, when the electronic device transmits a user command to the server, the electronic device may also transmit intermediate data being processed by the electronic device, thus enabling the server to perform processing in continuation from (or in succession to) the operation of the electronic device instead of starting processing. According to various example embodiments, when the electronic device fails to process the user command, the electronic device may provide intermediate data processed until the failure occurs in processing the user command to the server, and the server may process the user command from where the failure occurs, thereby minimizing a delay in response time.

In addition, various effects directly or indirectly identified from the disclosure may be provided.

BRIEF DESCRIPTION OF THE DRAWINGS

The above and other aspects, features and advantages of certain embodiments of the disclosure will be more apparent from the following detailed description, taken in conjunction with the accompanying drawing, in which the same or like reference numerals may be used for the same or like components, and in which.

DETAILED DESCRIPTION

Figure 1:
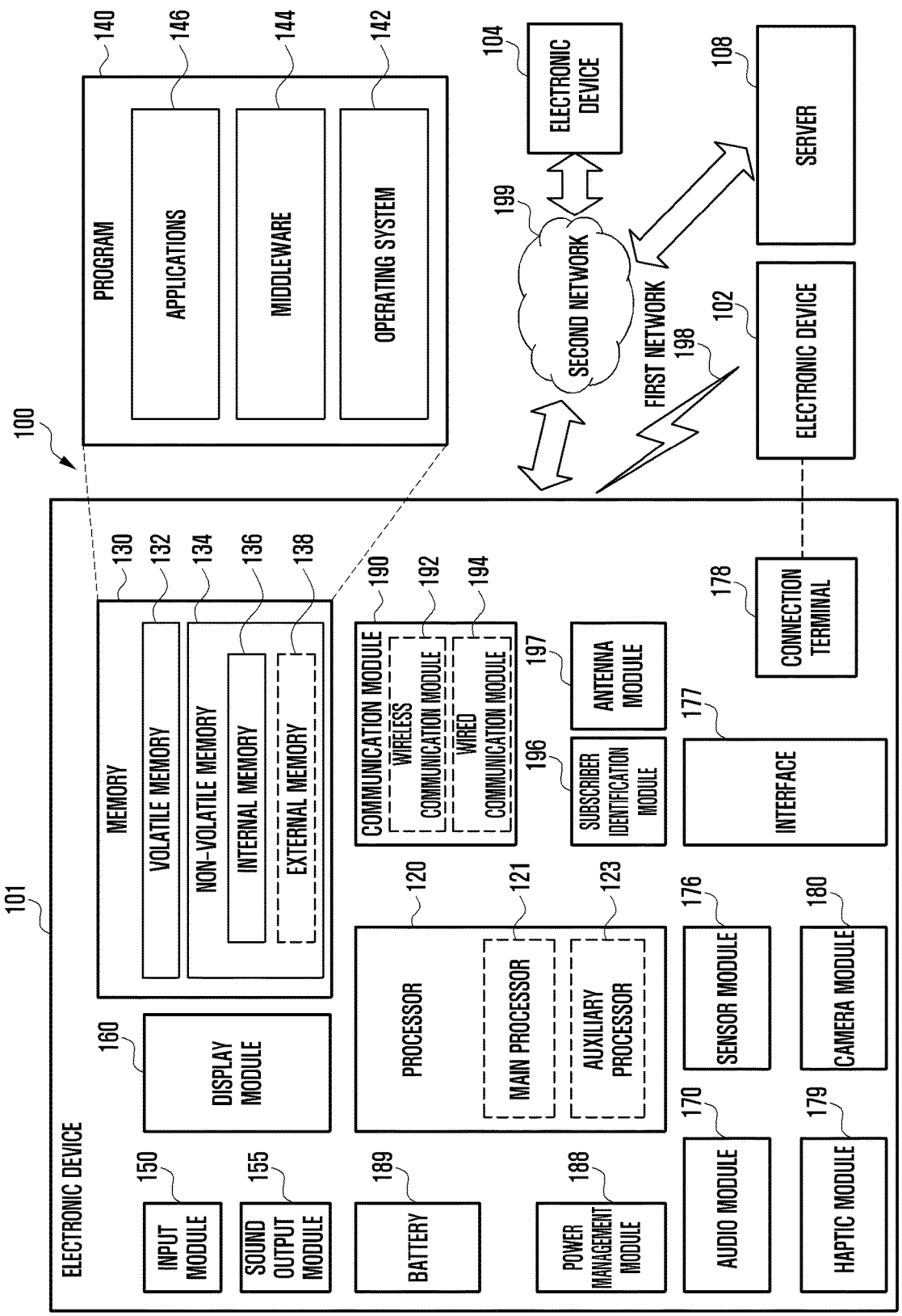
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
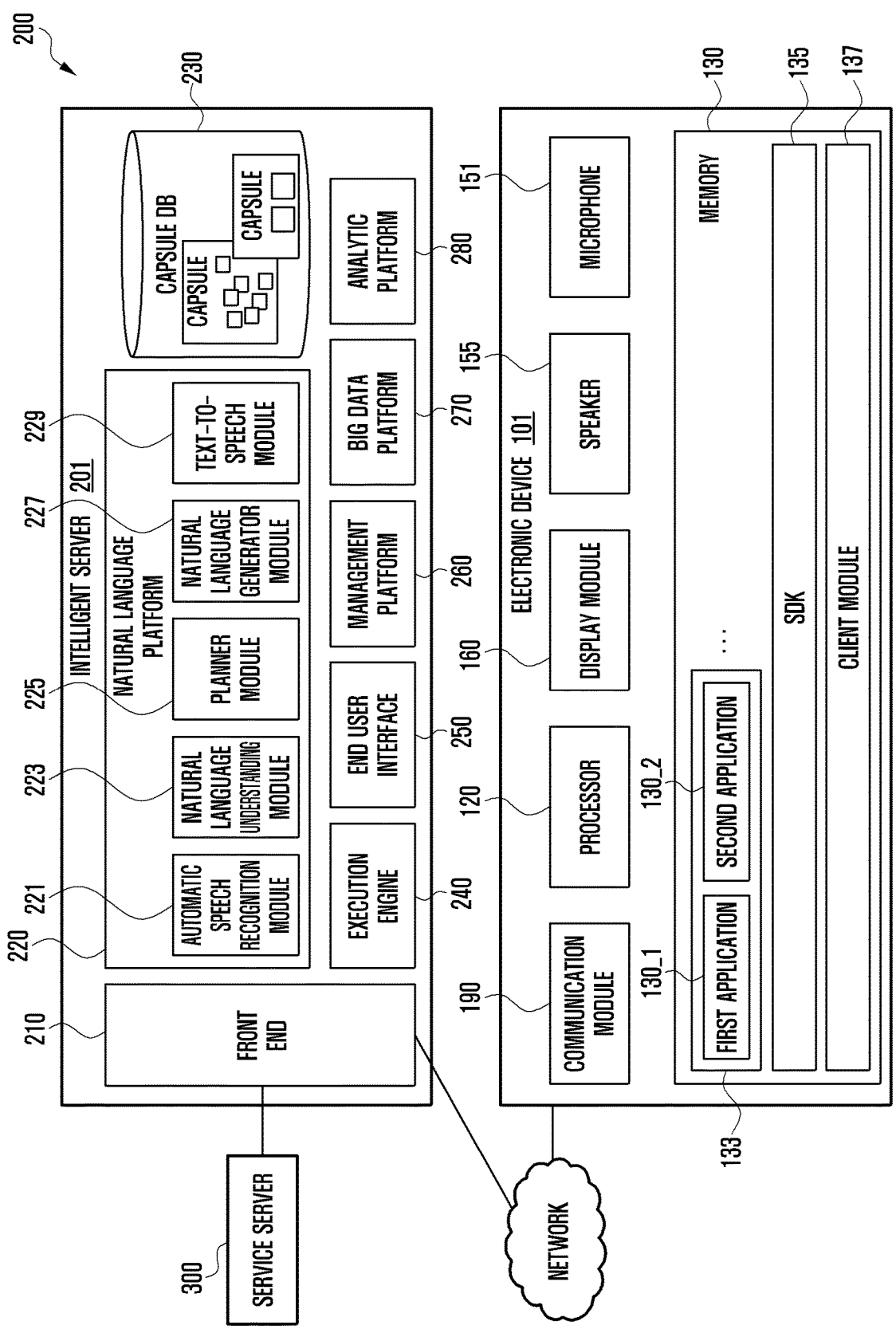
FIG. 2 is a block diagram illustrating an example integrated intelligence system according to various embodiments.

FIG. 2 is a block diagram illustrating an example integrated intelligence system according to various embodiments.

Referring to FIG. 2, the integrated intelligence system 200 according to the embodiment may include an electronic device 101, an intelligent server 201, and/or a service server 300.

The electronic device 101 of an embodiment may be a terminal device (or electronic device) that can be connected to the Internet, for example, a mobile phone, a smartphone, a personal digital assistant (PDA), a notebook computer, a TV, a domestic appliance, a wearable device, a head-mounted display (HMD), or a smart speaker.

According to the illustrated embodiment, the electronic device 101 may include a communication module (e.g., including communication circuitry) 190 (e.g., the wireless communication module 192 of FIG. 1), a microphone 151 (e.g., the input module 150 of FIG. 1), a speaker 155 (e.g., the sound output module 155 of FIG. 1), a display module 160, a memory 130, and/or a processor (e.g., including communication circuitry) 120. The listed components may be operatively or electrically connected to each other.

The communication module 190 according to an embodiment may include various communication circuitry and may be configured to be connected to an external device to transmit and receive data. The microphone 151 according to an embodiment may receive a sound (e.g., a user utterance)

and may convert the sound into an electrical signal. The speaker 155 according to an embodiment may output an electrical signal as a sound (e.g., a voice). The display module 160 according to an embodiment may be configured to display an image or a video. Further, the display module 160 according to an embodiment may display a graphic user interface (GUI) of an executed application (or application program).

The memory 130 according to an embodiment may store a client module 137, a software development kit (SDK) 135, and a plurality of applications 133. The client module 137 and the SDK 135 may form a framework (or a solution program) for performing a general-purpose function. In addition, the client module 137 or the SDK 135 may form a framework for processing a voice input.

The plurality of applications 133 stored in the memory 130 according to an embodiment may be programs for performing a designated function. According to an embodiment, the plurality of applications 133 may include a first application 130_1 and a second application 130_2. According to an embodiment, each of the plurality of applications 133 may include a plurality of operations for performing a designated function. For example, the applications 133 may include an alarm application, a message application, and/or a schedule application. According to an embodiment, the plurality of applications 133 may be executed by the processor 120 to sequentially execute at least some of the plurality of operations.

The processor 120 according to an embodiment may include various processing circuitry and control the overall operation of the electronic device 101. For example, the processor 120 may be operatively or electrically connected to the communication module 190, the microphone 151, the speaker 155, and the display module 160 to perform a designated operation.

The processor 120 according to an embodiment may execute a program stored in the memory 130 to perform a designated function. For example, the processor 120 may execute at least one of the client module 137 or the SDK 135 to perform the following operation for processing a voice input. The processor 120 may control the operation of the plurality of applications 133, for example, through the SDK 135. An operation to be described below as the operation of the client module 137 or the SDK 135 may be an operation executed by the processor 120.

The client module 137 according to an embodiment may receive a voice input. For example, the client module 137 may receive a voice signal corresponding to a user utterance detected through the microphone 151. The client module 137 may transmit the received voice input to the intelligent server 201. The client module 137 may transmit state information about the electronic device 101, together with the received voice input, to the intelligent server 201. The state information may be, for example, execution state information about an application.

The client module 137 according to an embodiment may receive a result corresponding to the received voice input from the intelligent server 201. For example, when the intelligent server 201 can produce the result corresponding to the received voice input, the client module 137 may receive the result corresponding to the received voice input from the intelligent server 201. The client module 137 may display the result received from the intelligent server 201 on the display module 160.

The client module 137 according to an embodiment may receive a plan corresponding to the received voice input from the intelligent server 201. The client module 137 may display a result of executing a plurality of operations of at least one application according to the plan on the display module 160. For example, the client module 137 may sequentially display results of executing the plurality of operations on the display module 160. In another example, the client module 137 may display only some (e.g., a result of executing the last operation) of the results of executing the plurality of operations on the display module 160.

According to an embodiment, the client module 137 may receive a request for obtaining information required to produce the result corresponding to the voice input from the intelligent server 201. According to an embodiment, the client module 137 may transmit the required information to the intelligent server 201 in response to the request.

The client module 137 according to an embodiment may transmit information about the result of executing the plurality of operations according to the plan to the intelligent server 201. The intelligent server 201 may identify that the received voice input has been properly processed using the information about the result.

The client module 137 according to an embodiment may include a speech recognition module. According to an embodiment, the client module 137 may recognize a voice input for performing a limited function through the speech recognition module. For example, the client module 137 may perform an intelligent application for processing a voice input through a designated input (e.g., Wake up!).

The intelligent server 201 according to an embodiment may receive information relating to a user voice input from the electronic device 101 through a communication network. According to an embodiment, the intelligent server 201 may change data relating to the received voice input into text data. According to an embodiment, the intelligent server 201 may generate, based on the text data, a plan for performing a task corresponding to the user voice input.

According to an embodiment, the plan may be generated by an artificial intelligence (AI) system. The artificial intelligence system may include a rule-based system or a neural network-based system (e.g., a feedforward neural network (FNN)), or a recurrent neural network (RNN). The artificial intelligence system may be a combination of the above systems or a different artificial intelligence system. According to an embodiment, the plan may be selected from a set of predefined plans, or may be generated in real time in response to a user request. For example, the artificial intelligence system may select at least one plan from among a plurality of predefined plans.

The intelligent server 201 according to an embodiment may transmit a result according to the generated plan to the electronic device 101 or may transmit the generated plan to the electronic device 101. According to an embodiment, the electronic device 101 may display the result according to the plan on the display module 160. According to an embodiment, the electronic device 101 may display a result of executing an operation according to the plan on the display module 160.

The intelligent server 201 according to an embodiment may include a front end 210, a natural language platform 220, a capsule DB 230, an execution engine 240, an end user interface 250, a management platform 260, a big data platform 270, and/or an analytic platform 280.

The front end 210 according to an embodiment may receive a voice input received from the electronic device 101. The front end 210 may transmit a response corresponding to the voice input to the electronic device 101.

According to an embodiment, the natural language platform 220 may include an automatic speech recognition module (ASR module) 221, a natural language understanding module (NLU module) 223, a planner module 225, a natural language generator module (NLG module) 227, and/or a text-to-speech (TTS) module 229, each of which may include various processing circuitry and/or executable program instructions.

The ASR module 221 according to an embodiment may convert a voice input received from the electronic device 101 into text data. The NLU module 223 according to an embodiment may understand a user's intent using the text data of the voice input. For example, the NLU module 223 may understand the user's intent by performing a syntactic analysis and/or a semantic analysis. The NLU module 223 according to an embodiment may understand the meaning of a word extracted from the voice input using a linguistic feature (e.g., a syntactic element) of a morpheme or phrase and may determine the user's intent by matching the understood meaning of the word to intent.

The planner module 225 according to an embodiment may generate a plan using the intent determined by the NLU module 223 and a parameter. According to an embodiment, the planner module 225 may determine a plurality of domains necessary to perform a task based on the determined intent. The planner module 225 may determine a plurality of operations respectively included in the plurality of domains determined based on the intent. According to an embodiment, the planner module 225 may determine a parameter required to execute the plurality of determined operations or a result value output by executing the plurality of operations. The parameter and the result value may be defined as a concept in a designated format (or class). Accordingly, the plan may include the plurality of operations determined by the intent of the user and a plurality of concepts.

The planner module 225 according to an embodiment may determine a relationship between the plurality of operations and the plurality of concepts by stages (or hierarchically). For example, the planner module 225 may determine the execution order of the plurality of operations, determined based on the user's intent, based on the plurality of concepts. That is, the planner module 225 may determine the execution order of the plurality of operations, based on the parameter required to execute the plurality of operations and the result output by executing the plurality of operations. Accordingly, the planner module 225 may generate a plan including association information (e.g., ontology) between the plurality of operations and the plurality of concepts. The planner module 225 may generate a plan using information stored in a capsule database 230 in which a set of relationships between concepts and operations is stored.

The NLG module 227 according to an embodiment may change designated information into a text form. The information changed into the text form may be in the form of a natural language utterance. The TTS module 229 according to an embodiment may change information in the text form into information in a voice form.

According to an embodiment, some or all functions of the natural language platform 220 may also be implemented in the electronic device 101.

The capsule database 230 according to an embodiment may store information about a relationship between a plurality of concepts and a plurality of operations corresponding to a plurality of domains. A capsule according to an embodiment may include a plurality of action objects (or pieces of action information) and a plurality of concept objects (or pieces concept information) included in a plan. According to an embodiment, the capsule database 230 may store a plurality of capsules in the form of a concept action network (CAN). According to an embodiment, the plurality of capsules may be stored in a function registry included in the capsule database 230.

According to an embodiment, the capsule database 230 may include a strategy registry that stores strategy information required to determine a plan corresponding to a voice input. The strategy information may include reference information for determining one plan when there is a plurality of plans corresponding to the voice input. According to an embodiment, the capsule database 230 may include a follow-up registry that stores information about a follow-up action for suggesting a follow-up action to the user in a specified situation. The follow-up may include, for example, a following utterance. According to an embodiment, the capsule database 230 may include a layout registry that stores layout information about information output through the electronic device 101.

According to an embodiment, the capsule database 230 may include a vocabulary registry that stores vocabulary information included in capsule information. According to an embodiment, the capsule database 230 may include a dialog registry that stores information about a dialog (or interaction) with the user. The capsule database 230 may update a stored object through a developer tool. The developer tool may include, for example, a function editor for updating an action object or a concept object. The developer tool may include a vocabulary editor for updating vocabulary.

The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition. In an embodiment, the capsule database 230 can also be implemented in the electronic device 101.

The execution engine 240 according to an embodiment may produce a result using the generated plan. The end user interface 250 according to an embodiment may transmit the produced result to the electronic device 101. Accordingly, the electronic device 101 may receive the result and may provide the received result to the user. The management platform 260 according to an embodiment may manage information used in the intelligent server 201. The big data platform 270 according to an embodiment may collect user data. The analytic platform 280 according to an embodiment may manage the quality of service (QoS) of the intelligent server 201. For example, the analytic platform 280 may manage a component and the processing speed (or efficiency) of the intelligent server 201.

The service server 300 according to an embodiment may provide a designated service (e.g., a food delivery service or a hotel reservation service) to the electronic device 101. According to an embodiment, the service server 300 may be a server operated by a third party. The service server 300 according to an embodiment may provide information for generating a plan corresponding to a received voice input to the intelligent server 201. The provided information may be stored in the capsule database 230. In addition, the service server 300 may provide result information according to the plan to the intelligent server 201.

In the foregoing integrated intelligent system 200, the electronic device 101 may provide various intelligent services to the user in response to a user input. The user input may include, for example, an input through a physical button, a touch input, or a voice input.

In an embodiment, the electronic device 101 may provide a voice recognition service through an intelligent application (or voice recognition application) stored therein. In this case, for example, the electronic device 101 may recognize a user utterance or a voice input received through the microphone 151 and may provide a service corresponding to the recognized voice input to the user.

In an embodiment, the electronic device 101 may perform a designated operation alone or together with the intelligent server 201 and/or the service server 300, based on the received voice input. For example, the electronic device 101 may execute an application corresponding to the received voice input and may perform the designated operation through the executed application.

In an embodiment, when the electronic device 101 provides a service together with the intelligent server 201 and/or the service server 300, the electronic device 101 may detect a user utterance using the microphone 151 and may generate a signal (or voice data) corresponding to the detected user utterance. The electronic device 101 may transmit the voice data to the intelligent server 201 using the communication module 190.

The intelligent server 201 according to an embodiment may generate, as a voice input received from the electronic device 101, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

The electronic device 101 according to an embodiment may receive the response using the communication module 190. The electronic device 101 may output an audio signal generated inside the electronic device 101 to the outside using the speaker 155 or may output an image generated inside the electronic device 101 to the outside using the display module 160.

Although FIG. 2 illustrates an example in which speech recognition of a voice input received from the electronic device 101, natural language understanding and generation, and production of a result using a plan are performed in the intelligent server 201, various embodiments of the disclosure are not limited thereto. For example, at least some components (e.g., the natural language platform 220, the execution engine 240, and the capsule database 230) of the intelligent server 201 may be embedded in the electronic device 101, and operations thereof may be performed by the electronic device 101.

Figure 3:
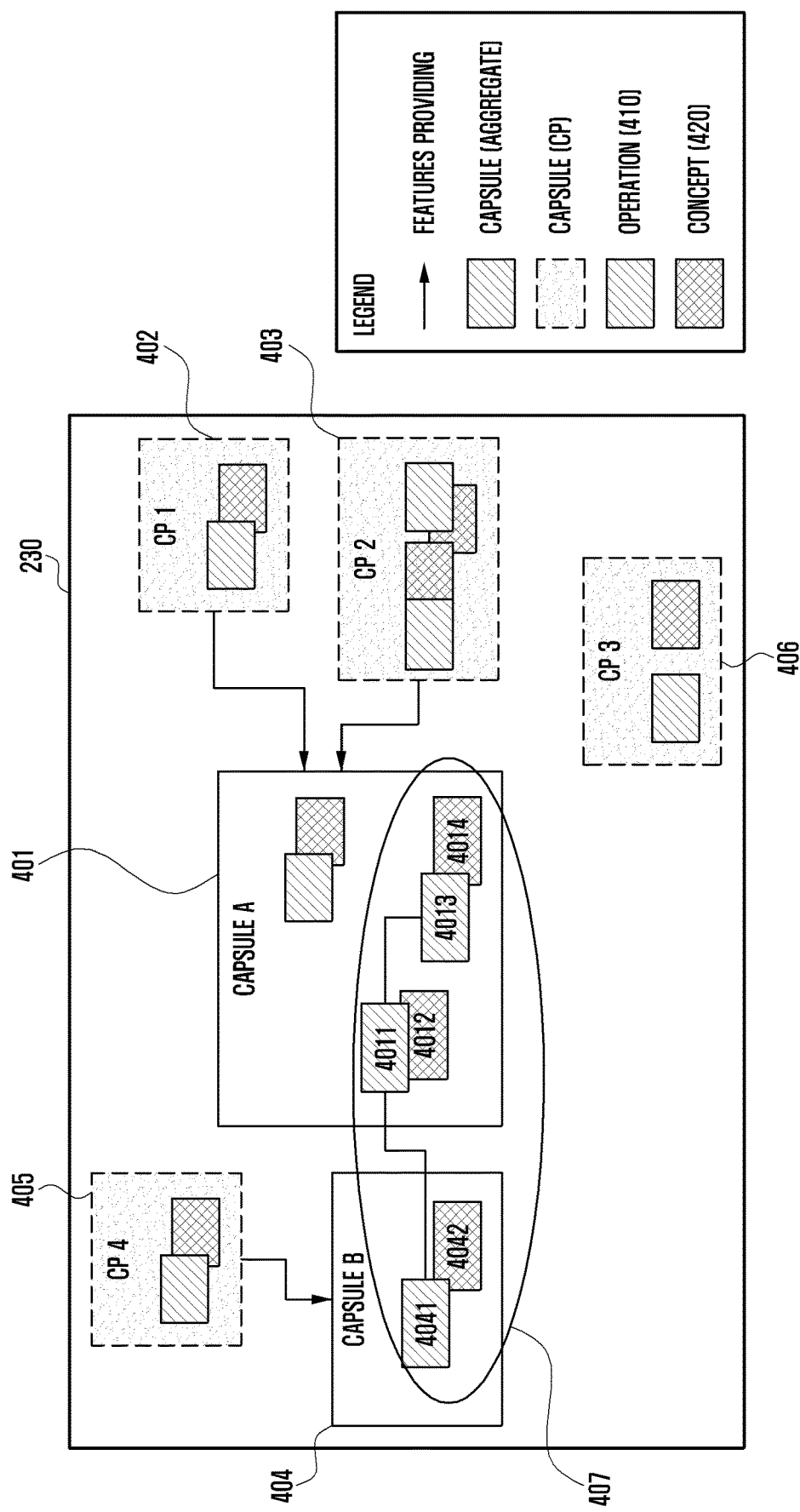
FIG. 3 is a diagram illustrating an example form in which information about a relationship between a concept and an action is stored in a database according to various embodiments.

FIG. 3 is a diagram illustrating an example form in which information about a relationship between a concept and an operation is stored in a database according to various embodiments.

A capsule database 230 of an intelligent server 201 may store a capsule in the form of a concept action network (CAN). The capsule database 230 may store an operation of processing a task corresponding to a voice input from a user and a parameter required for the operation in the form of a CAN.

The capsule database 230 may store a plurality of capsules (e.g., capsule A 401 and capsule B 404) respectively corresponding to a plurality of domains (e.g., applications).

According to an embodiment, one capsule (e.g., capsule A 401) may correspond to one domain (e.g., location (geo) or application). Further, one capsule may correspond to at least one service provider (e.g., CP 1 401, CP 2 403, CP 3 406, or CP 4 405) for performing a function for a domain related to the capsule. According to an embodiment, one capsule may include at least one operation 410 and at least one concept 420 for performing a specified function.

A natural language platform 220 may generate a plan for performing a task corresponding to a received voice input using a capsule stored in the capsule database 230. For example, a planner module 225 of the natural language platform 220 may generate the plan using the capsule stored in the capsule database 230. For example, the plan 407 may be generated using operations 4011 and 4013 and concepts 4012 and 4014 of capsule A 401 and an operation 4041 and a concept 4042 of capsule B 404.

Figure 4:
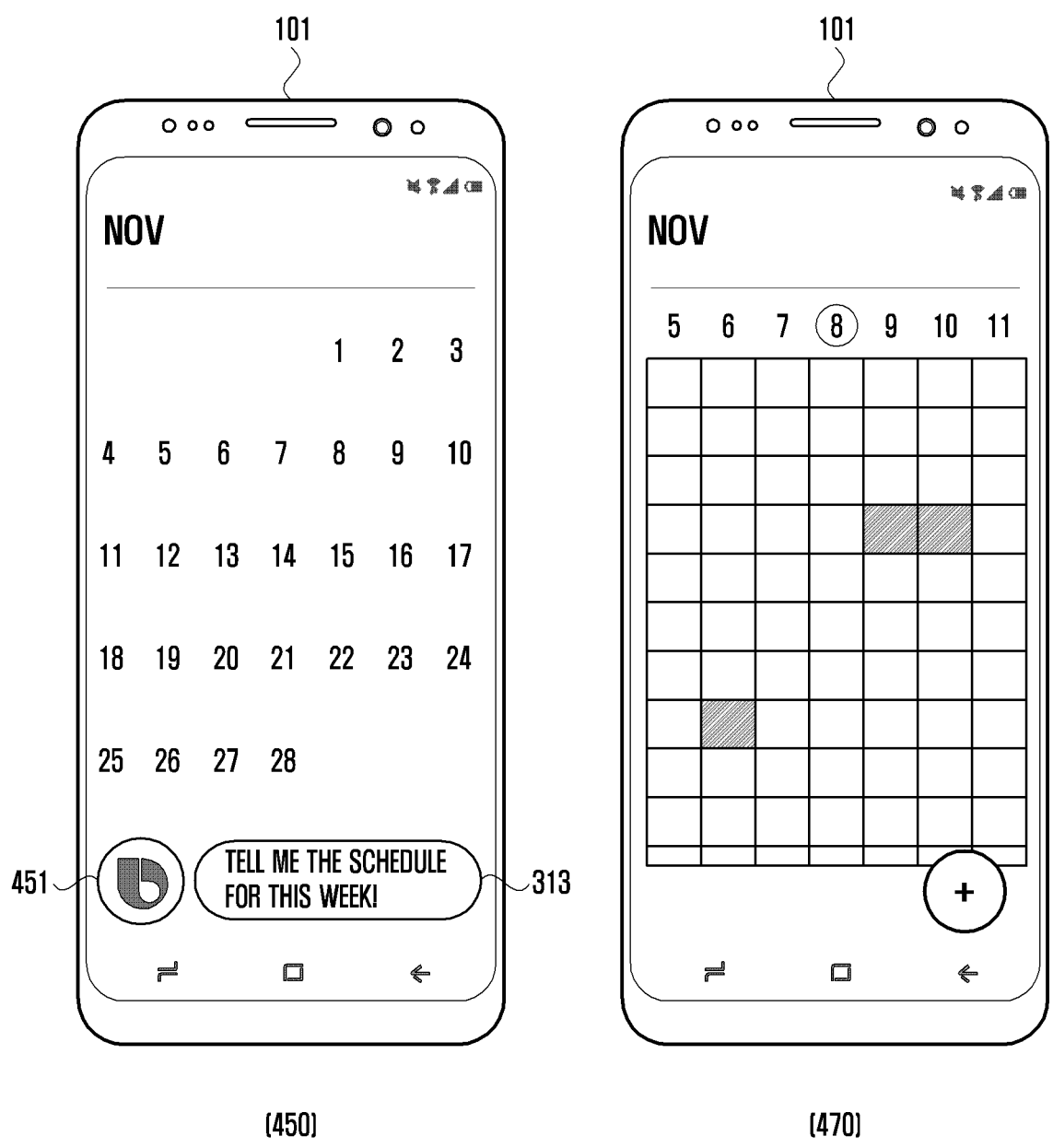
FIG. 4 is a diagram illustrating an example of a user interface for an electronic device to process a received voice input through an intelligent application according to various embodiments.

FIG. 4 is a diagram illustrating an example of a user interface for an electronic device to process a received voice input through an intelligent application according to various embodiments.

According to an embodiment, an electronic device 101 may execute an intelligent application to process a user command (e.g., a voice input) through an intelligent server 201.

According to an embodiment, when recognizing a designated voice input (e.g., Wake up!) or receiving an input via a hardware key (e.g., a dedicated hardware key), the electronic device 101 may execute the intelligent application for processing the voice input in a first user interface 450. For example, the electronic device 101 may execute the intelligent application in a state in which a schedule application is executed. According to an embodiment, the electronic device 101 may display an object 451 (e.g., an icon) corresponding to the intelligent application on a display module 160. According to an embodiment, the electronic device 101 may receive a voice input based on a user utterance. For example, the electronic device 101 may receive a voice input "Tell me the schedule for this week!" According to an embodiment, the electronic device 101 may display a user interface (UI, e.g., an input window) 313 of the intelligent application displaying text data of the received voice input on the display module 160.

According to an embodiment, the electronic device 101 may display a result corresponding to the received voice input in a second user interface 470 on the display module 160. For example, the electronic device 101 may receive a plan corresponding to the received user command (e.g., the received voice input) and may display "Schedule for this week" according to the plan on the display module 160.

Figure 5:
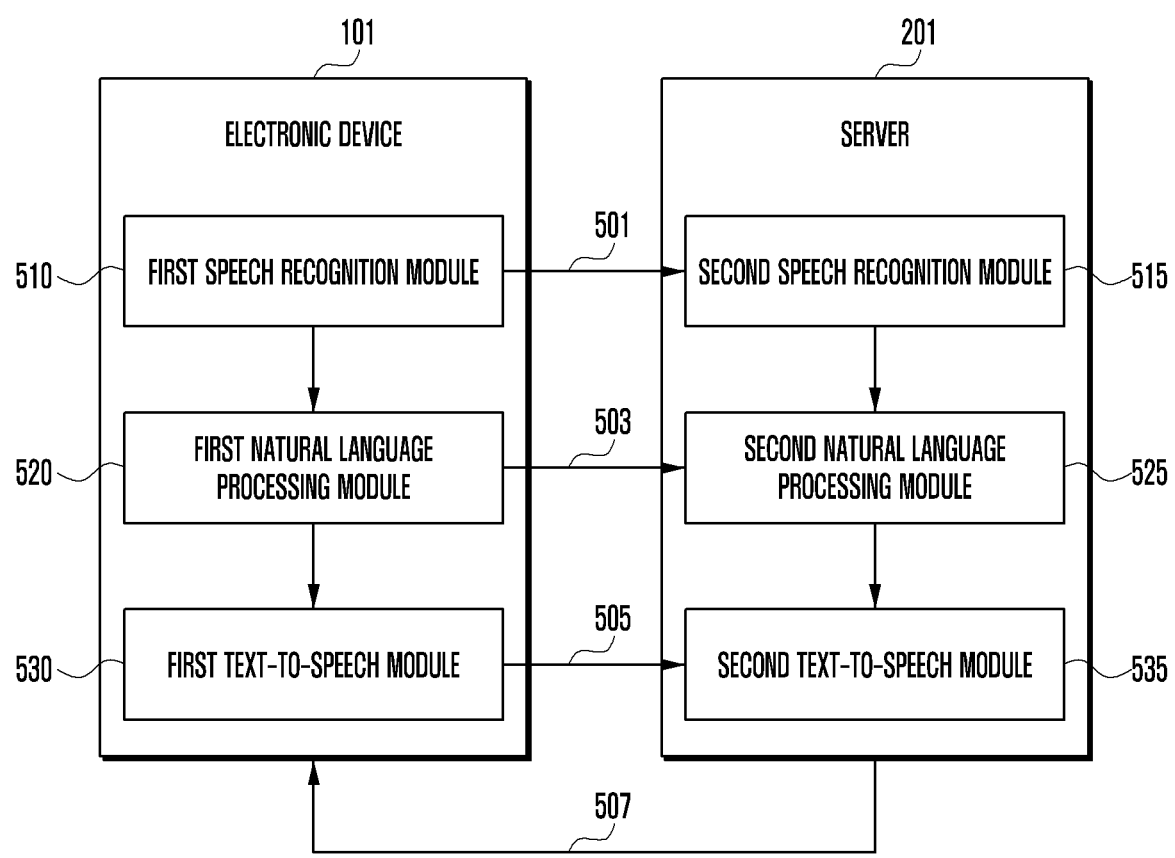
FIG. 5 is a diagram illustrating an example operation of processing a user command between an electronic device and a server according to various embodiments.

FIG. 5 is a diagram illustrating an example of processing speech recognition by each module between an electronic device and a server according to various embodiments.

According to an embodiment, FIG. 5 may illustrate an example of a configuration for an intelligent service (or a voice recognition service) (e.g., an intelligent assistant or intelligent personal assistant service) of an electronic device 101 through an interaction between the electronic device 101 and a server 201 (e.g., the intelligent server 201 of FIG. 2).

According to an embodiment, the electronic device 101 may include various types of devices that wirelessly connect the server 201 with a specified network (e.g., a Wi-Fi network or a cellular network) and include a function of providing information related to the intelligent service to the electronic device 101. For example, the electronic device 101 may include various devices, such as, for example, and without limitation, a mobile phone, a smartphone, a tablet personal computer (PC), a wearable device, a smart speaker, an Internet of things (IoT) device, a home appliance, and/or a notebook computer, or the like.

According to an embodiment, the electronic device 101 may include a first speech recognition module 510, a first natural language processing module 520, and/or a first text-to-speech module 530, each of which may include various processing circuitry and/or executable program instructions.

The electronic device 101 may further include at least one additional component in addition to the components illustrated in FIG. 5. According to an embodiment, the components of the electronic device 101 may form the same entity or separate entities.

According to an embodiment, the server 201 may include a second speech recognition module 515, a second natural language processing module 525, and/or a second text-to-speech module 535, each of which may include various processing circuitry and/or executable program instructions. According to an embodiment, the speech recognition modules 510 and 515, the natural language processing modules 520 and 525, and/or the text-to-speech modules 530 and 535 of the electronic device 101 and the server 201 may include, for example, functions and operations corresponding to the components of the natural language platform 220 of FIG. 2.

According to various embodiments, when providing an intelligent service (or a voice recognition service) (e.g., an intelligent assistant or intelligent personal assistant service), the electronic device 101 may enable processing by the electronic device 101 and processing by the server 201 to be continuously performed in units of each module (e.g., the speech recognition modules, the natural language processing modules, and/or the text-to-speech modules) For example, the electronic device 101 may process a user command via the first speech recognition module 510, the first natural language processing module 520, and the first text-to-speech module 530 in order, and when processing by a designated module needs to be performed in the server 201, the processing by the corresponding module of the electronic device 101 may be continuously performed by a module of the server 201 corresponding to the corresponding module of the electronic device 201.

According to an embodiment, the electronic device 101 may include a first-level utterance data processing capability, for example, a first-level speech recognition module and a first-level natural language processing module. According to an embodiment, the server 201 may include a second-level utterance data processing capability, which is higher than the first-level utterance data processing capability, for example, a second-level speech recognition module and a second-level natural language processing module.

According to an embodiment, when providing the intelligent service, the electronic device 101 may interact with the server 201 to provide an accurate and quick response through distributed processing of the user command. According to an embodiment, when an error or an unprocessable situation in processing the user command occurs in the electronic device 101, the electronic device 101 may provide intermediate data related to a module of the electronic device 101 corresponding to the error or the unprocessable situation (or data being processed by the module of the electronic device 101) to the server 201. According to an embodiment, the server 201 may receive the intermediate data, and may continue processing the user command from a module of the server 201 corresponding to the module of the electronic device 101, based on the intermediate data.

For example, the server 201 may perform the processing in continuation from a part corresponding to the intermediate data instead of starting to process the user command from the beginning.

According to an embodiment, the first speech recognition module 510 and/or the second speech recognition module 515 may convert a voice input received according to a user utterance into text data.

According to an embodiment, the first speech recognition module 510 may refer to an embedded ASR (eASR) module. According to an embodiment, the first speech recognition module 510 may convert a voice input received through a microphone (e.g., the microphone 151 of FIG. 2) of the electronic device 101 according to a user utterance into text data and may transmit the converted text data to the first natural language processing module 520. According to an embodiment, when the first speech recognition module 510 cannot convert the voice input into the text data (e.g., text data conversion fails), the first speech recognition module 510 may transmit intermediate data to the server 201 through a communication module (e.g., the communication module 190 of FIG. 1) so that the second speech recognition module 515 of the server 201 converts the voice input into the text data in operation 501. According to an embodiment, the intermediate data (e.g., first intermediate data) transmitted in a speech recognition operation of the electronic device 101 in operation 501 may include, for example, information about whether speech recognition is rejected (e.g., eASR rejection), a speech recognition result, a speech recognition score, and/or a domain and audio data related to the voice input received through the microphone 151.

According to various embodiments, a speech recognition score may refer to the confidence score of a speech recognition result with respect to a received voice input. For example, the confidence score of a speech recognition result may refer, for example, to how confident a prediction result obtained by a speech recognition module (e.g., the first speech recognition module 510) converting a received voice input into text is and/or how accurate the result is. In an embodiment, the speech recognition score and/or confidence score may be expressed as a kind of probability, for example, may be configured to a numerical value from m (e.g., m=0) to n (e.g., n=1.0).

According to various embodiments, a domain is an agent performing an operation corresponding to a user command and may include an application, a sub-task, a player included in a platform, and/or a service.

According to an embodiment, when the server 201 receives the intermediate data (e.g., the first intermediate data) from the electronic device 101, the server 201 may perform a corresponding operation subsequent to (or in succession to) a processing operation performed by the electronic device 101, based on the intermediate data. For example, the server 201 may identify a failure of processing in the first speech recognition module 510 of the electronic device 101, based on the intermediate data, and may convert the voice input into the text data using the second speech recognition module 515 of the server 201 corresponding to the first speech recognition module 510. According to an embodiment, the second speech recognition module 515 may refer to an ASR module (e.g., the ASR module 221 of FIG. 2). According to an embodiment, the second speech recognition module 515 may convert the voice input into the text data, based on the intermediate data received from the electronic device 101, and may transmit the converted text data to the second natural language processing module 525. According to an embodiment, the server 201 may process the user command related to the voice input through the second speech recognition module 515, the second natural language processing module 525, and the second text-to-speech module 535 in succession to the processing in the first speech recognition module 510 of the electronic device 101 and may transmit a processing result to the electronic device 101 in operation 507.

According to an embodiment, the first natural language processing module 520 and/or the second natural language processing module 525 may identify a user's intent using the text data of the voice input. For example, the first natural language processing module 520 and/or the second natural language processing module 525 may perform syntactic analysis and/or semantic analysis to identify the user's intent. According to an embodiment, the first natural language processing module 520 and/or the second natural language processing module 525 may understand the meaning of a word extracted from the voice input using a linguistic feature (e.g., a syntactic element) of a morpheme or phrase and may determine the user's intent by matching the understood meaning of the word to intent.

According to an embodiment, the first natural language processing module 520 may refer to an embedded NLU (eNLU) module. According to an embodiment, the first natural language processing module 520 may determine the user's intent using the text data converted by the first speech recognition module 510 and may transmit information (e.g., text) about the user's intent to the first text-to-speech module 530. According to an embodiment, when the first natural language processing module 520 cannot identify the user's intent, based on the text data (e.g., when failing to determine the user's intent), the first natural language processing module 520 may transmit intermediate data to the server 201 through the communication module 190 so that the second natural language processing module 525 of the server 201 determines the user's intent, based on the text data in operation 503. According to an embodiment, the intermediate data (e.g., second intermediate data) transmitted in a user intent identification operation of the electronic device 101 in operation 503 may include various information, for example, whether user intent identification is rejected (e.g., eNLU rejection), a user intent identification result, text (or tokenized text), context information (e.g., execution status information and execution history information), domain information, intent information, and/or slot information.

According to an embodiment, when the server 201 receives the intermediate data (e.g., the second intermediate data) from the electronic device 101, the server 201 may perform a corresponding operation subsequent to (or in succession to) a processing operation performed by the electronic device 101, based on the intermediate data. For example, the server 201 may identify a failure of processing in the first natural language processing module 520 of the electronic device 101, based on the intermediate data, and may identify the user's intent of the text data using the second natural language processing module 525 of the server 201 corresponding to the first natural language processing module 520. According to an embodiment, the second natural language processing module 525 may refer to an NLU module (e.g., the NLU module 223 of FIG. 2). According to an embodiment, the second natural language processing module 525 may determine the user's intent, based on the text data of the intermediate data received from the electronic device 101, and may transmit the determined intent (e.g., text related to the determined intent) to the second text-to-speech module 535. According to an embodiment, the server 201 may process the user command related to the voice input through the second natural language processing module 525 and the second text-to-speech module 535 in succession to the processing in the first natural language processing module 520 of the electronic device 101 and may transmit a processing result to the electronic device 101 in operation 507.

According to an embodiment, the first text-to-speech module 530 and/or the second text-to-speech module 535 may convert information in a text form into information in a voice form.

According to an embodiment, the first text-to-speech module 530 may refer to an embedded TTS (eTTS) module. According to an embodiment, the first text-to-speech module 530 may perform voice conversion (or voice synthesis) on text corresponding to the user's intent determined by the first natural language processing module 520 and may provide a response (or result) to a user through a speaker (e.g., the speaker 155 of FIG. 2). According to an embodiment, when the first text-to-speech module 530 cannot process text-to-speech conversion, based on the text corresponding to the user's intent (e.g., when text-to-speech conversion fails), the first text-to-speech module 530 may transmit intermediate data to the server 201 through the communication module 190 so that the second text-to-speech module 535 of the server 201 performs text-to-speech conversion based on the text in operation 505. According to an embodiment, the intermediate data (e.g., third intermediate data) transmitted in a text-to-speech conversion operation of the electronic device 101 in operation 505 may include information, for example, whether text-to-speech conversion is rejected (e.g., eTTS rejection), a text-to-speech conversion result, and/or text.

According to an embodiment, when the server 201 receives the intermediate data (e.g., the third intermediate data) from the electronic device 101, the server 201 may perform a corresponding operation subsequent to (or in succession to) a processing operation performed by the electronic device 101, based on the intermediate data. For example, the server 201 may identify a failure of processing in the first text-to-speech module 530 of the electronic device 101, based on the intermediate data, and may perform text-to-speech conversion on the text using the second text-to-speech module 535 of the server 201 corresponding to the first text-to-speech module 530. According to an embodiment, the second text-to-speech module 535 may refer to a TTS module (e.g., the TTS module 229 of FIG. 2). According to an embodiment, the second text-to-speech module 535 may perform voice conversion, based on the text of the intermediate data received from the electronic device 101, and may transmit a conversion result (e.g., audio data) to the electronic device 101. According to an embodiment, the server 201 may process the user command related to the voice input through the second text-to-speech module 535 in succession to the processing in the first text-to-speech module 530 of the electronic device 101 and may transmit a processing result to the electronic device 101 in operation 507.

According to an embodiment, the electronic device 101 may output a processing result (e.g., a voice signal) corresponding to the user command processed inside the electronic device 101 to the outside using the speaker 155, or may output information (e.g., text and application (or function) execution screen) related to the processing result to the outside using a display module 160. According to an embodiment, the electronic device 101 may receive a processing result corresponding to the user command processed by the server 201 from the server 201 using the communication module 190. According to an embodiment, the electronic device 101 may output the received processing result (e.g., a voice signal) to the outside using the speaker 155 or may output information (e.g., text and application (or function) execution screen) related to the processing result to the outside using the display module 160.

Figure 6:
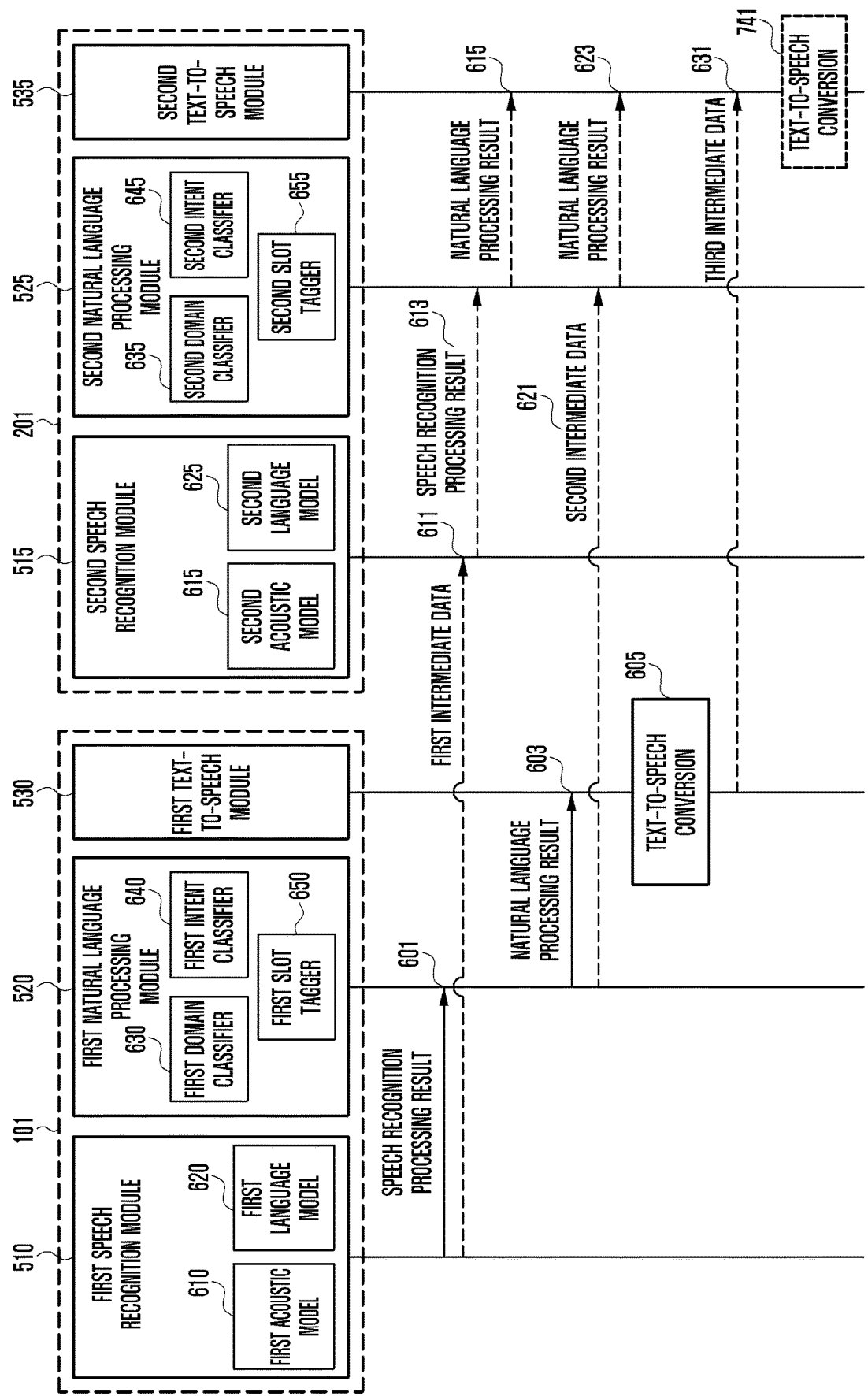
FIG. 6 is a diagram illustrating an example operation of processing a user command by each module between an electronic device and a server according to various embodiments.
Figure 7:
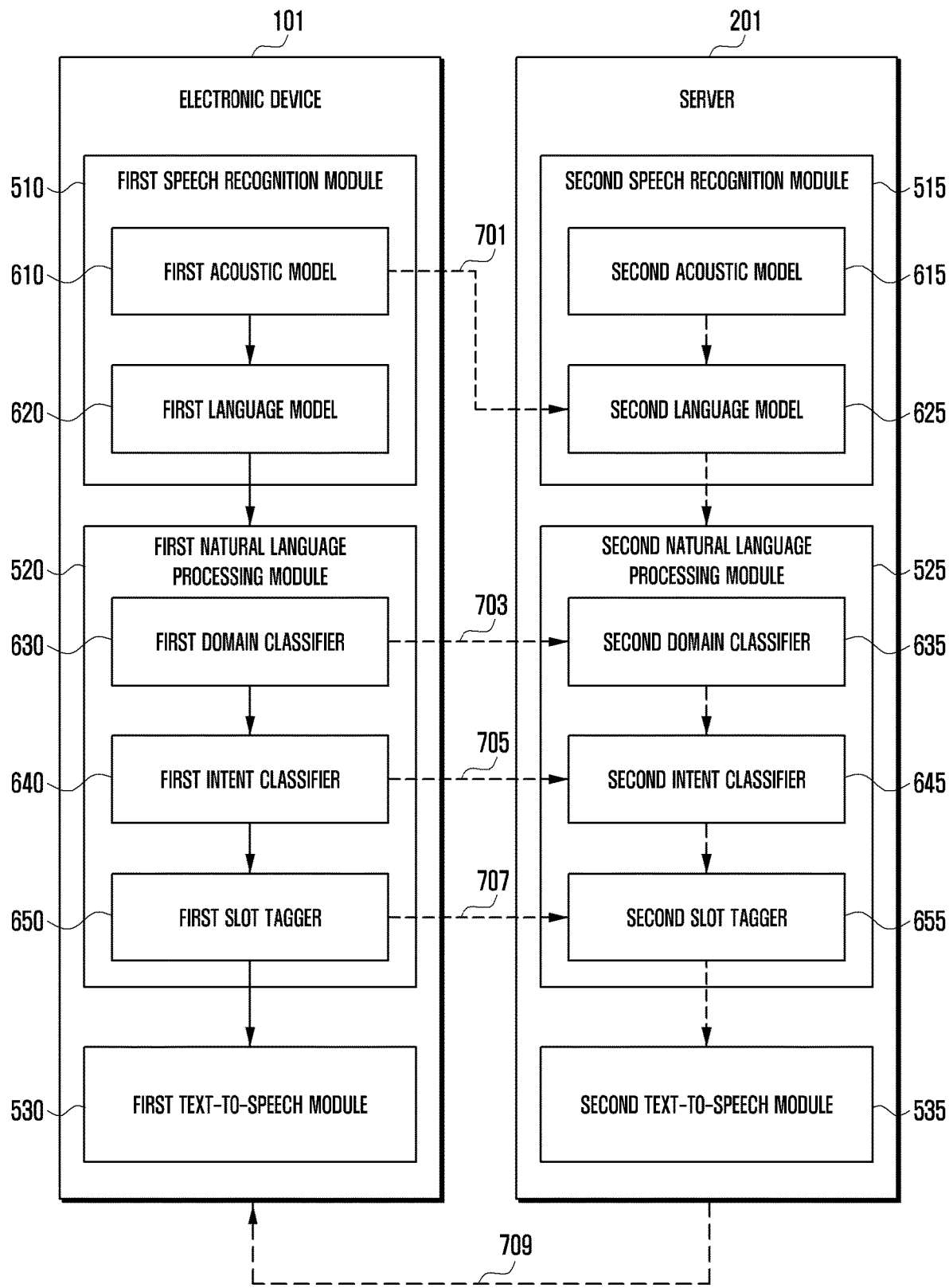
FIG. 7 is a diagram illustrating an example scenario in which a user command is processed by each module between an electronic device and a server according to various embodiments.

FIG. 6 is a diagram illustrating an example operation of processing a user command by each module between an electronic device and a server according to various embodiments. FIG. 7 is a diagram illustrating an example of a scenario in which a user command is processed by each module between an electronic device and a server according to various embodiments.

As illustrated in FIG. 6 and FIG. 7, an electronic device 101 according to an embodiment may include a first speech recognition module 510, a first natural language processing module 520, and a first text-to-speech module 530. The first speech recognition module 510 according to an embodiment may include a first acoustic model 610 (or a first encoder) and a first language model 620 (or a first decoder). The first natural language processing module 520 according to an embodiment may include a first domain classifier 630, a first intent classifier 640, and a first slot tagger 650. A server 201 according to an embodiment may include a second speech recognition module 515, a second natural language processing module 525, and a second text-to-speech module 535. The second speech recognition module 515 according to an embodiment may include a second acoustic model 615 (or a second encoder) and a second language model 625 (or a second decoder). The second natural language processing module 525 according to an embodiment may include a second domain classifier 635, a second intent classifier 645, and a second slot tagger 655.

The speech recognition modules 510 and 515 according to an embodiment may include the acoustic models (e.g., 610 and 615) and the language models (e.g., 620 and 625) to implement a function of converting voice data into text information. For example, the acoustic models and/or the language models may include an artificial neural network.

According to an embodiment, in FIG. 6 and FIG. 7, an operation performed according to a solid arrow may indicate an operation routine of the electronic device 101 when a user command is processed inside the electronic device 101. According to an embodiment, in FIG. 6 and FIG. 7, an operation performed according to a dashed or dotted arrow may indicate an operation routine of the server 201 when each module of the server 201 corresponding to each module of the electronic device 101 processes the user command in succession to an operation of the electronic device 101 by the electronic device 101 interacting with the server 201 while the electronic device 101 processes the user command. For example, the electronic device 101 may process a user command via the first speech recognition module 510, the first natural language processing module 520, and the first text-to-speech module 530 in order, and when a situation in which the user command needs to be processed by the server 201 occurs while processing the user command, the user command may be processed by each module from a corresponding module of the server 201.

Referring to FIG. 6, according to an embodiment, when a voice is received according to a user utterance, the electronic device 101 may perform speech recognition of the received voice using the first speech recognition module 510 and may transmit a speech recognition processing result (e.g., text data) to the first natural language processing module 520 (e.g., operation 601). The electronic device 101 may perform natural language processing (e.g., user intent determination and conversion into a text form) using the speech recognition processing result by the first natural language processing module 520 and may transmit a natural language processing result (e.g., information in a text form) to the first text-to-speech module 530 (e.g., operation 603). The electronic device 101 may convert the natural language processing result (e.g., the information in the text form) into information in a voice form (e.g., text-to-speech conversion) by the first text-to-speech module 530 (e.g., operation 605). According to an embodiment, the electronic device 101 may transmit a text-to-speech conversion result (e.g., the information in the voice form) and/or text to a speaker 155 and/or a display module 160, and may output a processing result (or response) of the user command through the speaker 155 and/or the display module 160.

According to an embodiment, when the first speech recognition module 510 cannot perform speech recognition processing (e.g., text data conversion), the electronic device 101 may transmit first intermediate data to the server 201 through a communication module 190 (e.g., operation 611). For example, the electronic device 101 may request the server 201 to perform speech recognition processing by the second speech recognition module 515 of the server 201. According to an embodiment, when the first natural language processing module 520 cannot perform natural language processing (e.g., user intent determination and/or conversion into a text form), the electronic device 101 may transmit second intermediate data to the server 201 through the communication module 190 (e.g., operation 621). For example, the electronic device 101 may request the server 201 to perform natural language processing by the second natural language processing module 525 of the server 201. According to an embodiment, when the first text-to-speech module 530 cannot perform text-to-speech conversion (or processing result generation or derivation), the electronic device 101 may transmit third intermediate data to the server 201 through the communication module 190 (e.g., operation 631).

According to various embodiments, each module (e.g., the first speech recognition module 510, the first natural language processing module 520, and the first text-to-speech module 530) of the electronic device 101 may define intermediate data (e.g., the first intermediate data, the second intermediate data, and the third intermediate data) transmitted to the server 201, and the intermediate data may be different depending on the characteristics and structure of each module. An example of intermediate data will be described in greater detail below with reference to a drawing (e.g., FIG. 8 to FIG. 14) to be illustrated below.

According to an embodiment, the server 201 may perform processing of the user command by the electronic device 101 in succession, based on intermediate data received from the electronic device 101.

For example, upon receiving the first intermediate data (e.g., operation 611), the server 201 may sequentially perform a speech recognition processing operation to an operation of processing the user command, such as speech recognition processing (e.g., operation 613), natural language processing (e.g., operation 615), and text conversion (e.g., operation 741), by the second speech recognition module 515, the second natural language processing module 525, and the second text-to-speech module 535, and may transmit a processing result to the electronic device 101.

In another example, upon receiving the second intermediate data (e.g., operation 621), the server 201 may sequentially perform a natural language processing operation to an operation of processing the user command, such as natural language processing (e.g., operation 623) and text conversion (e.g., operation 741), by the second natural language processing module 525 and the second text-to-speech module 535, and may transmit a processing result to the electronic device 101.

In another example, upon receiving the third intermediate data (e.g., operation 631), the server 201 may perform a text-to-speech conversion operation to an operation of processing the user command, such as text-to-speech conversion (e.g., operation 741), by the second text-to-speech module 535, and may transmit a processing result to the electronic device 101.

An example of an operation between the electronic device 101 and the server 201 for example operation 611 according to an embodiment will be described.

According to an embodiment, the electronic device 101 may receive a user voice as audio data through the first speech recognition module 510 and may perform automatic speech recognition (ASR) using the received audio data. According to an embodiment, the electronic device 101 may transmit the received audio data to the second speech recognition module 515 of the server 201. For example, when the first speech recognition module 510 of the electronic device 101 cannot process the user voice, the second speech recognition module 515 of the server 201 may perform fast processing using the audio data received from the electronic device 101 and stored. For example, the electronic device 101 may partially transmit the audio data instead of transmitting the entire audio data corresponding to the user voice at once, thereby reducing a response time additionally required. The server 201 may not perform an actual automatic speech recognition operation using the audio data while the electronic device 101 performs processing using the audio data, making it possible to reduce waste of resources by the server 201 and to perform fast processing using the audio data.

According to an embodiment, the electronic device 101 may perform automatic speech recognition in the first speech recognition module 510, and when the speech recognition fails, the electronic device 101 may transmit the first intermediate data to the server 201, thus requesting the second speech recognition module 515 of the server 201 to perform speech recognition. For example, the server 201 may perform speech recognition using the second speech recognition module 515 in succession to the electronic device 101. For example, the server 201 may process an operation continuing from the second speech recognition module 515 of the server 201 to the second natural language processing module 525.

According to an embodiment, the electronic device 101 may perform automatic speech recognition in the first speech recognition module 510 and may then determine whether the server 201 needs to perform natural language processing. According to an embodiment, when the electronic device 101 determines to transfer natural language processing to the server 201 according to a determination result, the electronic device 101 may transmit a speech recognition processing result of the first speech recognition module 510 as the first intermediate data to the server 201, thus requesting the second natural language processing module 525 of the server 201 to perform natural language processing. For example, the server 201 may perform natural language processing using the second natural language processing module 525 in succession to the electronic device 101. For example, the server 201 may process an operation continuing from the first speech recognition module 510 of the electronic device 101 to the second natural language processing module 525 of the server 201.

According to an embodiment, the first intermediate data transmitted from the electronic device 101 to the server 201 in operation 611 may include, for example, rejection information indicating that processing by the first speech recognition module 510 is impossible, a result of performing automatic speech recognition by the first speech recognition module 510, and score information indicating the suitability of the result of performing the automatic speech recognition. According to an embodiment, the second speech recognition module 515 of the server 201 may include a post-processing module for post-processing, and the first speech recognition module 510 of the electronic device 101 may transmit the first intermediate data including information (e.g., domain information) available for the post-processing module to the second speech recognition module 515 of the server 201. For example, the second speech recognition module 515 of the server 201 may perform only a suitable operation using the information received from the first speech recognition module 510 of the electronic device 101, thereby reducing execution time. For example, when a processing result of the electronic device 101 may be appropriate but a domain requires a large amount of data that cannot be used by the electronic device 101, the server 201 may only perform post-processing (e.g., domain determination).

According to an embodiment, as illustrated in FIG. 6 or FIG. 7, the speech recognition modules (e.g., the first speech recognition module 510 and the second speech recognition module 515) may include the acoustic models (or encoders) (e.g., the first acoustic model 610 and the second acoustic model 615) and the language models (or decoders) (e.g., the first language model 620 and the second language model 625). According to various embodiments, the speech recognition modules 510 and 515 may further subdivide the acoustic models and the language models to be divided into functional units or layer units. For example, when the acoustic models and the language models have an artificial neural network structure including a plurality of layers, the layers may be subdivided into an input layer, a hidden layer, and/or an output layer, thereby processing a speech recognition operation.

According to an embodiment, referring to FIG. 7, the electronic device 101 may transmit a processing result of the first acoustic model 610 of the first speech recognition module 510 to the second language model 625 of the second speech recognition module 515 of the server 201 (e.g., operation 701). For example, the electronic device 101 may receive a user voice as audio data through the first speech recognition module 510, may perform first automatic speech recognition (e.g., voice information identification) through the first acoustic model 610, and may analyze the voice information of the audio data.

The first speech recognition module 510 of the electronic device 101 may analyze the voice information according to the automatic speech recognition in the first acoustic model 610 using the received audio data, and may transmit intermediate data (e.g., the first intermediate data) to the server 201 to request the second language model 625 of the second speech recognition module 515 to perform second automatic speech recognition (e.g., syntactic identification) when it is impossible to perform the second automatic speech recognition through the first language model 620. For example, the server 201 may perform speech recognition processing using the second language model 625 in succession to the electronic device 101.

According to an embodiment, the first speech recognition module 510 of the electronic device 101 and the second speech recognition module 515 of the server 201 may have different versions depending on a distribution period (e.g., version updating), and the electronic device 101 and the server 201 may further include an operation of identifying whether the first speech recognition module 510 and the second speech recognition module 515 are compatible in an initial operation. For example, the electronic device 101 and the server 201 may identify compatibility between the first speech recognition module 510 and the second speech recognition module 515 by exchanging information (e.g., version information) when initially connected. According to an embodiment, when the first speech recognition module 510 and the second speech recognition module 515 are compatible so that a result from the first acoustic model 610 of the electronic device 101 can be used in the second language model 625 of the server 201, the first speech recognition module 510 may transmit the result from the first acoustic model 610 to the second speech recognition module 515 of the server 201, thereby further reducing the execution time of the automatic speech recognition by the server 201. For example, the electronic device 101 and the server 201 identify the compatibility when initially connected, and the electronic device 101 may transmit the audio data to the second speech recognition module 515 of the server 201 as in operation 611 when there is no compatibility, and may transmit the result from the first acoustic model 610 of the electronic device 101 to the second speech recognition module 515 of the server 201 as in operation 701 when there is the compatibility. Accordingly, when processing in the second speech recognition module 515 of the server 201 is subsequently required, the second speech recognition module 515 of the server 201 may immediately continue an operation from the second language model 625, based on the compatibility.

An example of an operation between the electronic device 101 and the server 201 for example operation 621 according to an embodiment will be described.

According to an embodiment, the electronic device 101 may perform natural language processing in the first natural language processing module 520, and when the natural language processing fails, the electronic device 101 may transmit the second intermediate data to the server 201, thus requesting the second natural language processing module 525 of the server 201 to perform natural language processing. For example, the server 201 may perform natural language processing using the second natural language processing module 525 in succession to the electronic device 101. For example, the server 201 may process an operation continuing from the first speech recognition module 510 of the electronic device 101 to the second natural language processing module 525 of the server 201. According to an embodiment, the second intermediate data transmitted from the electronic device 101 to the server 201 in operation 621 may include, for example, a result of converting a user voice into text (e.g., text or tokenized text) and context information (e.g., execution status information and execution history information) that helps to understand user intent. According to an embodiment, the context information may include execution status information corresponding to status information about which question the user is currently asking and/or which command a user question is needed for and execution history information corresponding to a history of which command the user has previously given and which operation has been conducted. According to an embodiment, the second intermediate data may include a result of a tokenizer, which is one pre-processing operation of the natural language processing module, and the result of the tokenizer may include a result of dividing (or separating) a user command by a unit of a token, such as a word, an ending, and/or a postposition.

According to an embodiment, as illustrated in FIG. 6 or FIG. 7, the natural language processing modules (e.g., the first natural language processing module 520 and the second natural language processing module 525) may include the domain classifiers (e.g., the first domain classifier 630 and the second domain classifier 635), the intent classifiers (e.g., the first intent classifier 640 and the second intent classifier 645), and the slot taggers (e.g., the first slot tagger 650 and the second slot tagger 655), and the natural language processing modules 520 and 525 may be further subdivided to perform a natural language processing operation. For example, the natural language processing modules 520 and 525 may be divided into subdivided modules according to a functional unit or a layer unit, and the electronic device 101 may transmit intermediate data to the server 201 by a unit of each subdivided module of the first natural language processing module 520 so that the server 201 continues natural language processing. According to an embodiment, the domain classifiers 630 and 635 may refer to modules to determine a domain in which the user gives utterance. According to an embodiment, the intent classifiers 640 and 645 may refer to modules to determine user intent (or action). According to an embodiment, the slot taggers 650 and 655 may refer to modules to extract an entity and pieces of information included in a user command. According to an embodiment, the domain classifiers 630 and 635 may determine a domain (e.g., an application), based on the speech recognition processing result of the speech recognition modules 510 and 515, and may transmit domain information to the intent classifiers 640 and 645. According to an embodiment, the intent classifications 640 and 645 may determine user intent (or action), based on the domain information, and may transmit intent information (or action information) to the slot taggers 650 and 655. According to an embodiment, the slot taggers 650 and 655 may extract a slot (or parameter) (e.g., parameter information for performing a function), based on the intent information, and may transmit slot information to the text-to-speech modules 530 and 535. According to an embodiment, when the electronic device 101 transmits intermediate data from the first natural language processing module 520 to the second natural language processing module 525 of the server 201, the electronic device 101 may include domain information, intent information, and/or slot information processed by the first natural language processing module 520 in each intermediate data corresponding to each subdivided module and may transmit the intermediate data.

According to an embodiment, assuming that a user utterance is "Order Americano from Star Valley with Mark!", the natural language processing modules 520 and 525 are may collect a domain (e.g., coffee ordering application), intent (or action) (e.g., ordering coffee from Star Valley (e.g., ordering place)), and a slot (or parameter) (e.g., Americano), based on the user utterance. For example, the natural language processing modules 520 and 525 may collect all of the domain, the intent (or action), and the slot (or parameter) necessary to process a user command from the user utterance.

According to an embodiment, referring to FIG. 7, the electronic device 101 may transmit the processing result (e.g., domain information) of the first domain classifier 630 of the first natural language processing module 520 to the second domain classifier 635 of the second natural language processing module 525 of the server 201 (e.g., operation 703). For example, when the electronic device 101 performs domain determination through the first domain classifier 630, based on a speech recognition processing result, but fails in domain determination through the first domain classifier 630, the electronic device 101 may transmit intermediate data to the server 201, thereby requesting the second domain classifier 635 to perform domain determination. According to an embodiment, the intermediate data may include the domain information determined by the first domain classifier 630. For example, the server 201 may perform a domain determination operation using the second domain classifier 635 in succession to the electronic device 101. According to an embodiment, the electronic device 101 may transmit the processing result (e.g., domain information) of the first domain classifier 630 to the second intent classifier 645 of the server 201. For example, when the electronic device 101 performs domain determination through the first domain classifier 630 but cannot perform user intent analysis through the first intent classifier 640, the electronic device 101 may transmit intermediate data to the server 201, thereby requesting the second intent classifier 645 of the server 201 to determine user intent.

According to an embodiment, the electronic device 101 may transmit the processing result (e.g., intent information) of the first intent classifier 640 of the first natural language processing module 520 to the second intent classifier 645 of the second natural language processing module 525 of the server 201 (e.g., operation 705). For example, when the electronic device 101 analyzes user intent based on the domain information through the first intent classifier 640 but fails to determine the user intent through the first intent classifier 640, the electronic device 101 may transmit intermediate data to the server 201, thereby requesting the second intent classifier 645 to perform user intent determination. According to an embodiment, the intermediate data may include the domain information determined by the first domain classifier 630 and the intent information determined by the first intent classifier 640. For example, the server 201 may perform a user intent determination operation using the second intent classifier 645 in succession to the electronic device 101. According to an embodiment, the electronic device 101 may transmit the processing result (e.g., intent information) of the first intent classifier 640 to the second slot tagger 655 of the server 201. For example, when the electronic device 101 determines the user intent through the first intent classifier 640 but cannot perform parameter extraction through the first slot tagger 650, the electronic device 101 may transmit intermediate data to the server 201, thereby requesting the second slot tagger 655 of the server 201 to extract a parameter.

According to an embodiment, the electronic device 101 may transmit the processing result (e.g., slot information) of the first slot tagger 650 of the first natural language processing module 520 to the second slot tagger 655 of the second natural language processing module 525 of the server 201 (e.g., operation 707). For example, when the electronic device 101 performs slot (or parameter) extraction based on the intent information through the first slot tagger 650 but fails to extract a slot through the first slot tagger 650, the electronic device 101 may transmit intermediate data to the server 201, thereby requesting the second slot tagger 655 to perform slot extraction. According to an embodiment, the intermediate data may include the domain information determined by the first domain classifier 630, the intent information determined by the first intent classifier 640, and the slot information extracted by the first slot tagger 650. For example, the server 201 may perform a slot extraction operation using the second slot tagger 655 in succession to the electronic device 101. According to an embodiment, the electronic device 101 may transmit the processing result (e.g., slot information) of the first slot tagger 650 to the second text-to-speech module 535 of the server 201. For example, when the electronic device 101 extracts a slot through the first slot tagger 650 but cannot perform text-to-speech conversion through the first text-to-speech module 530, the electronic device 101 may transmit intermediate data to the server 201, thereby requesting the second text-to-speech module 535 of the server 201 to perform text-to-speech conversion.

According to an embodiment, when processing the user command using the intermediate data received from the electronic device 101, the server 201 may transmit the processing result to the electronic device 101 in operation 709. According to an embodiment, the electronic device 101 may receive the processing result from the server 201 and may output the processing result to the outside (e.g., a user) through the speaker 155 and/or the display module 160.

According to various embodiments of the disclosure, a speech recognition module (e.g., the first speech recognition module 510 of FIG. 5 to FIG. 7), a natural language processing module (e.g., the first natural language processing module 520 of FIG. 5 to FIG. 7), a text-to-speech module (e.g., the text-to-speech module 530 of FIG. 5 to FIG. 7) of an electronic device 101 may be configured by a processor 120. For example, components (e.g., the speech recognition module, the natural language processing module, and the text-to-speech module) included in the processor 120 may be understood, for example, as hardware modules (e.g., circuitry), but various embodiments are not limited thereto. For example, the components included in the processor 120 may additionally or alternatively include a software structure in addition to a hardware structure. According to an embodiment, the components included in the processor 120 may be configured as software (e.g., the program 140 of FIG. 1) including one or more instructions stored in a storage medium (e.g., the memory 130) readable by the processor 120. According to an embodiment, operations performed by the speech recognition module, the natural language processing module, and/or the text-to-speech module may be executed by instructions that are stored in the memory 130 and causes the processor 120 to operate when executed.

Hereinafter, an example in which an electronic device 101 transmits each data (e.g., first intermediate data, second intermediate data, and/or third intermediate data) to a server 201 according to various embodiments is described with reference to FIG. 8 to FIG. 14.

Figure 8:
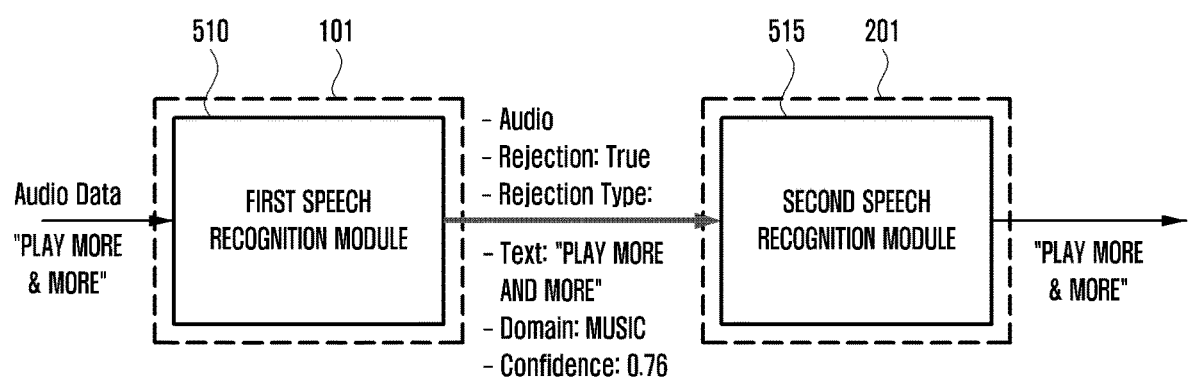
FIG. 8 and FIG. 9 are diagrams illustrating examples in which an electronic device transmits data to a server according to various embodiments.
Figure 9:
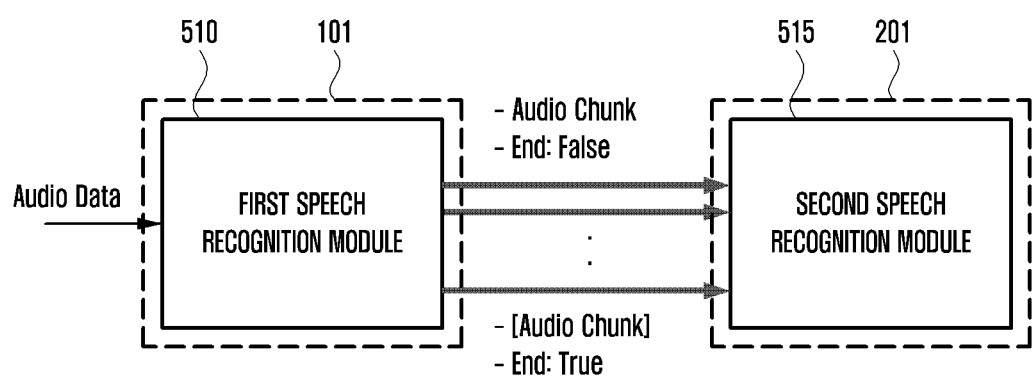

FIG. 8 and FIG. 9 are diagrams illustrating examples in which an electronic device transmits data to a server according to various embodiments.

According to an embodiment, FIG. 8 and FIG. 9 may illustrate examples of data transmitted from a first speech recognition module 510 of an electronic device 101 to a second speech recognition module 515 of a server 201.

Referring to FIG. 8, when a user of the electronic device 101 inputs audio data (e.g., a command "Play More & More") but the first speech recognition module 510 of the electronic device 101 cannot identify the meaning of "More & More" (e.g., as being a song title), the first speech recognition module 510 of the electronic device 101 may literally recognize the user's utterance (pronunciation) as "more and more".

According to an embodiment, when the electronic device 101 can identify that the command is related to music through the first speech recognition module 510 or when the confidence score (or confidence grade) of a speech recognition result is lower than a reference value, the electronic device 101 may transmit the command to the server 201 to accurately process the command.

According to an embodiment, data transmitted from the electronic device 101 to the server 201 may include an audio, a text result (e.g., "Play More & More") recognized by the electronic device 101, domain information (e.g., "MUSIC") indicating a music-related command, and the confidence score (or speech recognition score) (e.g., Confidence: 0.76) of the speech recognition result recognized by the first speech recognition module 510. In an embodiment, "Confidence" is a speech recognition score, which indicates how confident the speech recognition result of a speech recognition model (e.g., the first speech recognition module 510) is and may be used as the same concept in a different component (e.g., the first natural language processing module 520).

According to an embodiment, the data transmitted from the electronic device 101 to the server 201 may include "Rejection" and "Rejection Type". In an embodiment, "Rejection" may indicate information about whether the electronic device 101 (e.g., the first speech recognition module 510) is capable of performing speech recognition on the command and may be expressed as "True" or "False". In an embodiment, "Rejection Type" may indicate information about a reason for which speech recognition cannot be performed when "Rejection" is "False", and the information may be expressed as being divided into types.

According to an embodiment, at least some of pieces of data transmitted from the electronic device 101 (e.g., the first speech recognition module 510) to the server 201 (e.g., the second speech recognition module 515) may be omitted in some cases. For example, it may not be explicitly transmitted to the server 201 that the electronic device 101 has normally processed the user's command, and the electronic device 101 may transmit a request to the server 201 only when necessary.

According to an embodiment, the audio data illustrated in FIG. 8 may be transmitted in chunks a plurality of times as illustrated in FIG. 9. For example, when the size of audio data to be transmitted from the electronic device 101 to the server 201 is large (e.g., equal to or greater than a designated size), it may take a long time to transmit the audio data at once. Accordingly, the electronic device 101 may divide the audio data into designated units (e.g., chunks) and may transmit the units in real time. This operation may be performed in parallel with recognition of the user's command in the first speech recognition module 510 of the electronic device 101, and a value (e.g., End: True) indicating that the transmitted audio data is the last data may also be added.

According to an embodiment, as described above, the electronic device 101 may transmit intermediate data of each model (e.g., module unit) rather than audio data, for which version information may be used to identify compatibility. Examples are illustrated in FIG. 10, FIG. 11A, and FIG. 11B which will be described in greater detail below.

Figure 10:
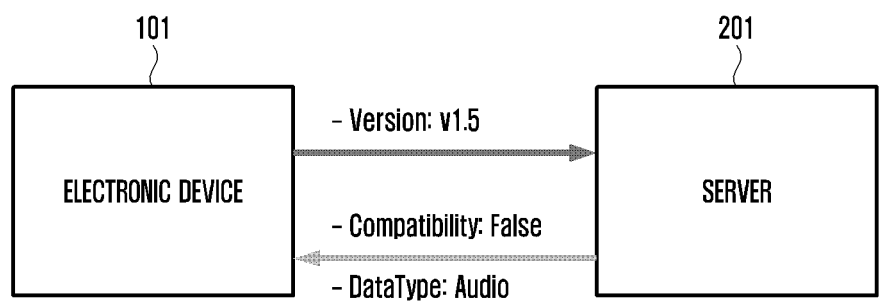
FIG. 10 is a diagram illustrating an example of identifying compatibility between an electronic device and a server according to various embodiments.
Figure 11A:
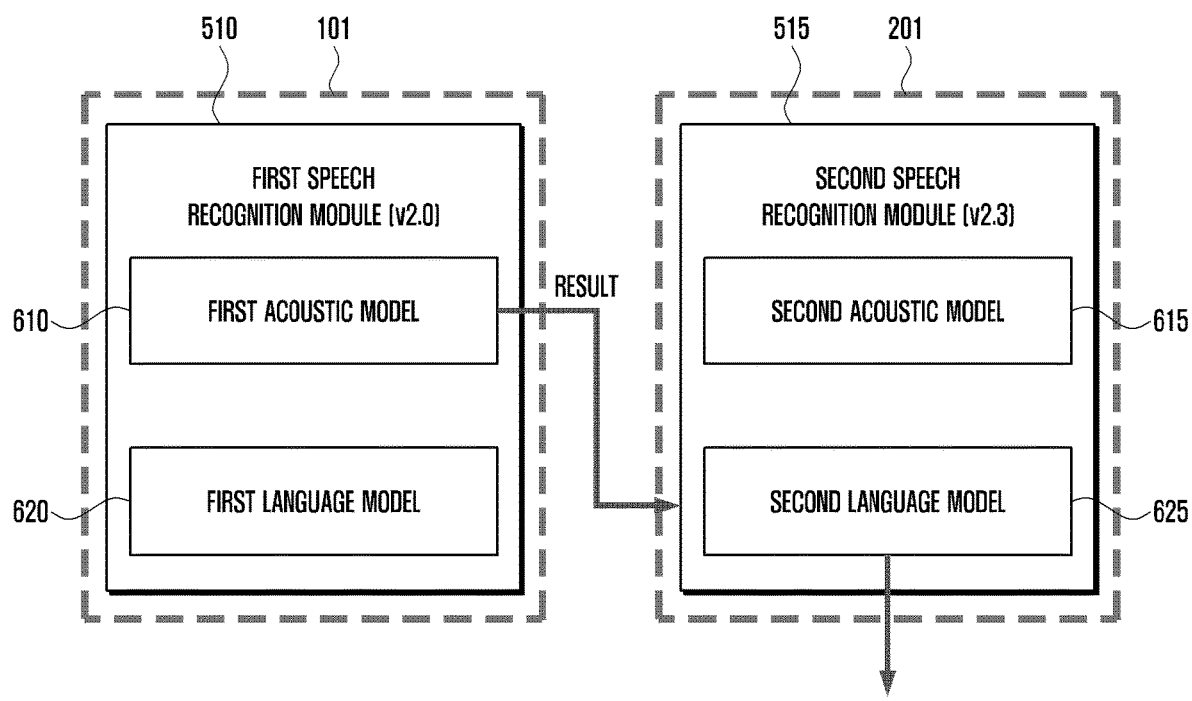
FIG. 11A and FIG. 11B are diagrams illustrating examples of data transmission according to the versions of an electronic device and a server according to various embodiments.

FIG. 10 is a diagram illustrating an example of identifying compatibility between an electronic device and a server according to various embodiments. FIG. 11A and FIG. 11B are diagrams illustrating examples of data transmission according to the versions of an electronic device and a server according to various embodiments.

Referring to FIG. 10, according to an embodiment, an electronic device 101 may transmit version information (e.g., Version: v1.5) about the electronic device 101 to a server 201. According to an embodiment, when receiving the version information about the electronic device 101 from the electronic device 101, the server 201 may determine compatibility with the electronic device 101, based on the version information about the electronic device 101 and may transmit "True" (e.g., Compatibility: True) or "False" (e.g., Compatibility: False) regarding the compatibility with the electronic device 101. According to an embodiment, the server 201 may transmit a data type (e.g., Data Type: Audio) that can be processed by the server 201. In an embodiment, the version information transmitted from the electronic device 101 to the server 201 may include, for example, first version information about the version of the entire electronic device 101 and/or second version information about the version of each module unit.

Figure 11B:
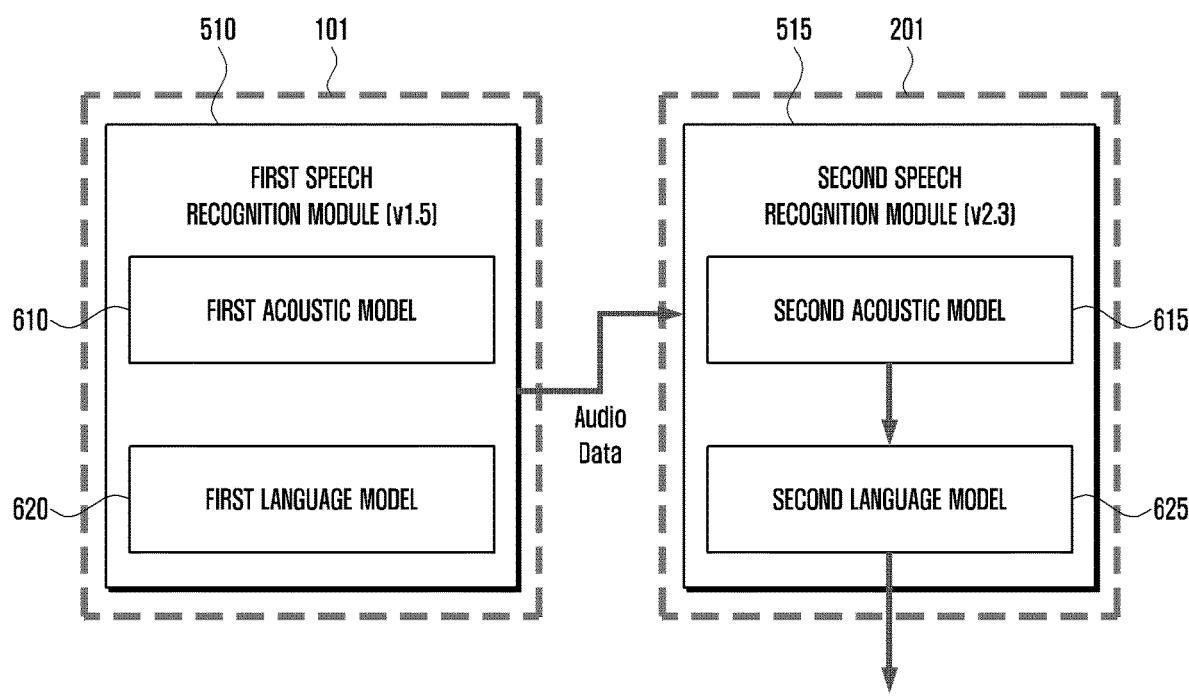

According to an embodiment, it may be assumed that the version of the server 201 is v2.3 and is compatible with a designated lower version (e.g., v2.0) or above, and the version of the electronic device 101 is v2.0 (e.g., see FIG. 11A) or v1.5 (e.g., see FIG. 11B). According to an embodiment, as illustrated in FIG. 11A, the electronic device 101 in a version of v2.0 is compatible with the server 201 and may transmit a result (e.g., intermediate data of a first acoustic model 610) of a model (e.g., the first acoustic model 610 or a first language model 620 of a first speech recognition module 510) to the server 201. According to an embodiment, as illustrated in FIG. 11B, the electronic device 101 in a version of v1.5 is not compatible with the server 201 and may transmit audio data to the server 201, rather than intermediate data the first acoustic model 610 or the first language model 620 of the first speech recognition module 510.

According to an embodiment, the foregoing method may be similarly used in other models (e.g., natural language processing modules 520 and 525). For example, the electronic device 101 and the server 201 may generate a model that learns general-purpose information using a large amount of data and may then configure various classifiers (e.g., domain classifiers 630 and 635, intent classifiers 640 and 645, and/or slot taggers 650 and 655) that distinguish necessary labels using the result of the model. In this case, data that can be transmitted from the electronic device 101 to the server 201 may be, for example, text data or the result of a pre-trained model as illustrated in FIG. 12 to FIG. 14 which will be described in greater detail below.

Figure 12:
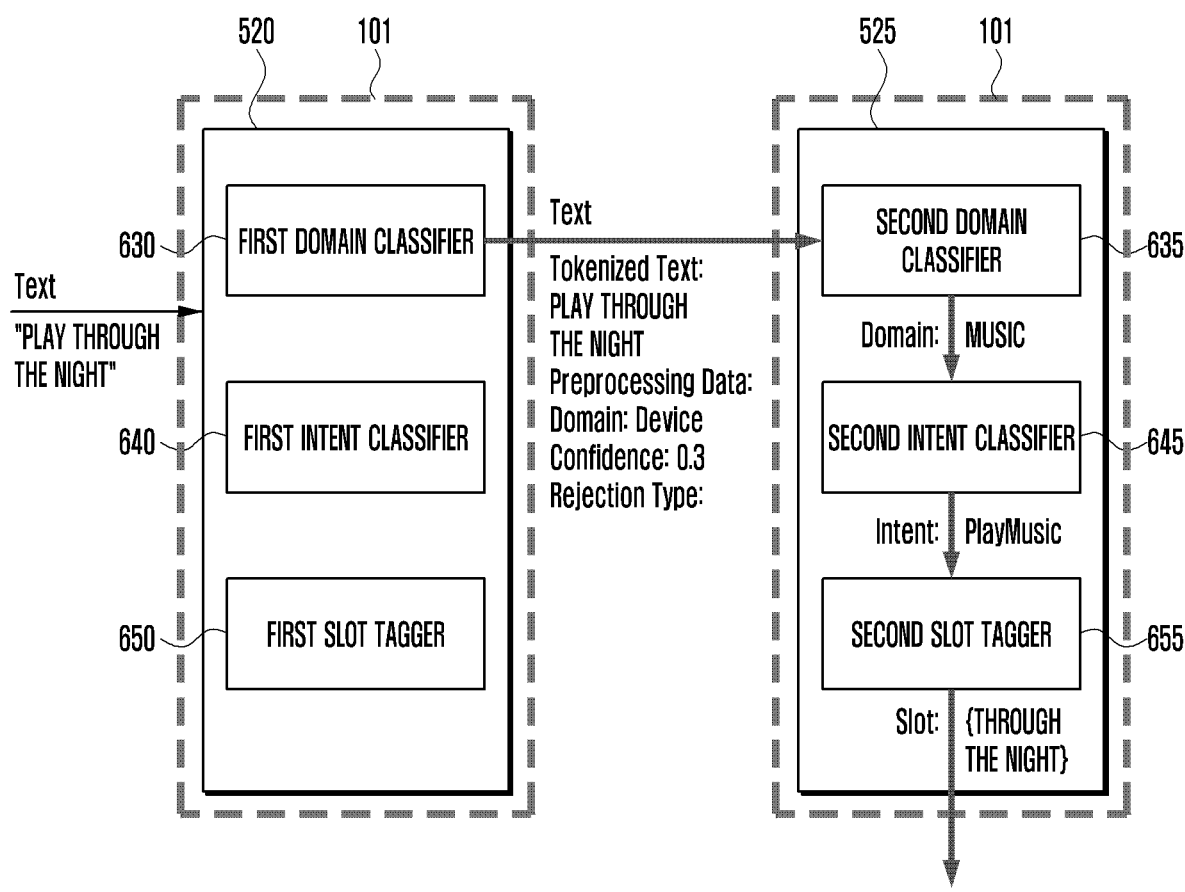
FIG. 12 is a diagram illustrating an example of transmitting data from an electronic device to a server according to various embodiments.
Figure 13:
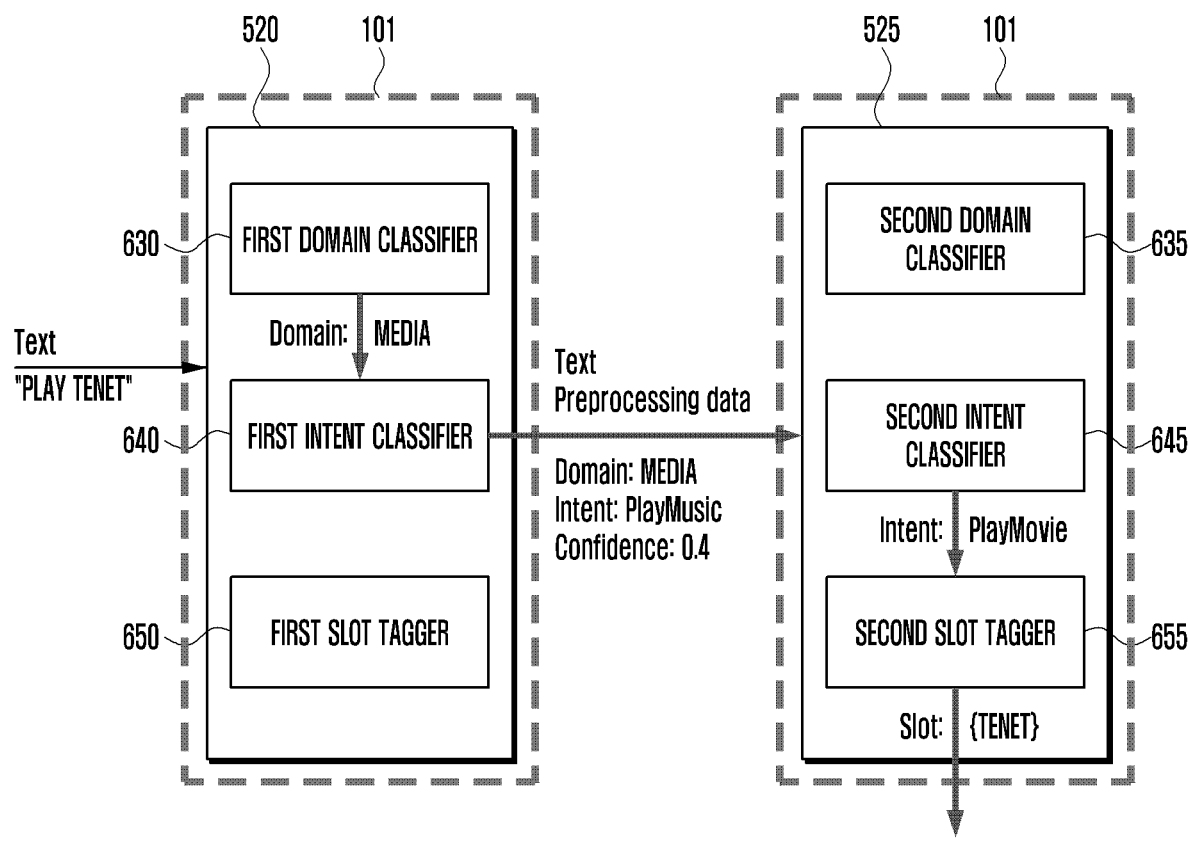
FIG. 13 is a diagram illustrating an example of transmitting data from an electronic device to a server according to various embodiments.
Figure 14:
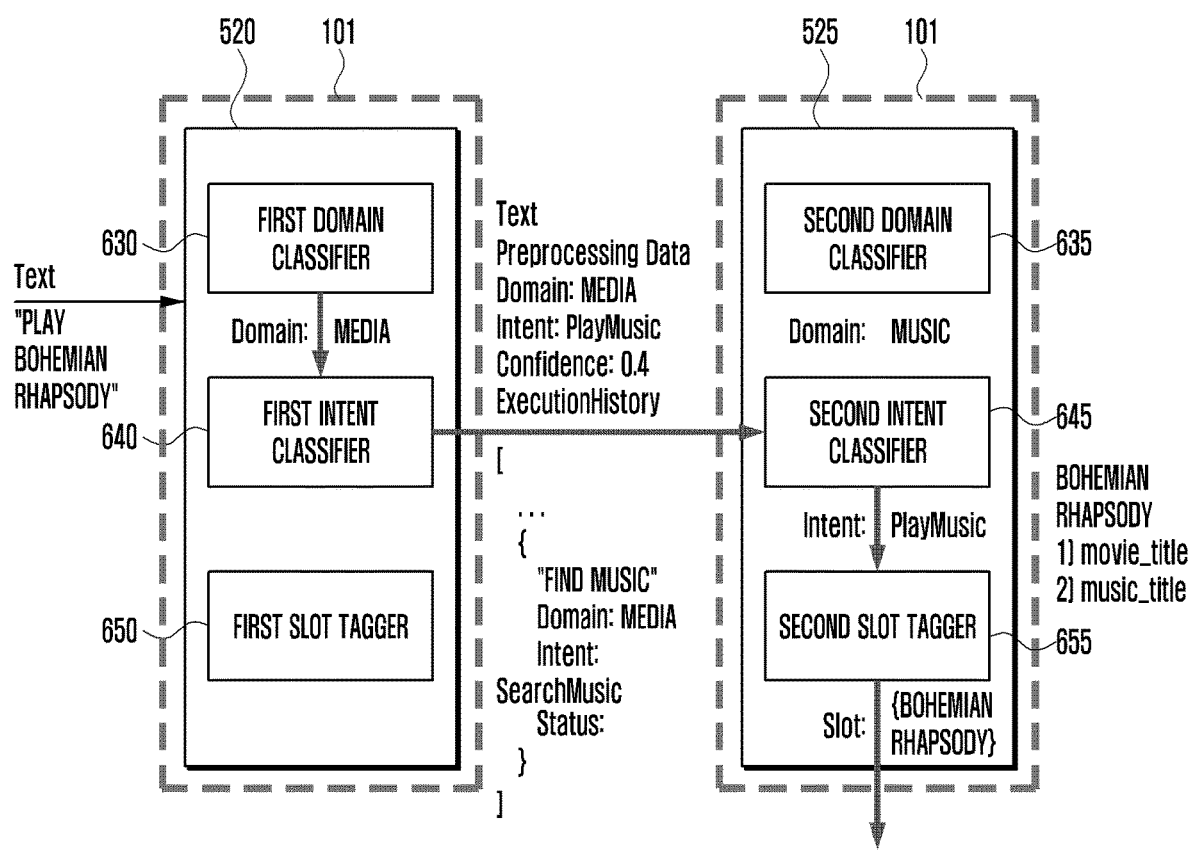
FIG. 14 is a diagram illustrating an example of transmitting data from an electronic device to a server according to various embodiments.

FIG. 12, FIG. 13, and FIG. 14 are diagrams illustrating examples of transmitting data from an electronic device to a server according to various embodiments.

According to an embodiment, FIG. 12, FIG. 13, and FIG. 14 illustrate examples of data transmitted in each module unit from a first natural language processing module 520 of an electronic device 101 to a second natural language processing module 525 of a server 201 for natural language processing.

Referring to FIG. 12, FIG. 12 illustrates an example of data transmitted from a first domain classifier 630 of the electronic device 101 to a second domain classifier 635 of the server 201.

As illustrated in FIG. 12, a user of the electronic device 101 may input a designated command (e.g., a command "Play Through the Night"). According to an embodiment, the designated command may be input as text data by the user, and the text data may be input as an input value to the first natural language processing module 520. According to an embodiment, the designated command may be input as a voice command by the user, and a result value (or text data) obtained by converting the voice command into text in a first speech recognition module 510 may be input as an input value to the first natural language processing module 520. According to an embodiment, when the first natural language processing module 520 (e.g., the first domain classifier 630) of the electronic device 101 cannot identify the meaning of "Through the Night" (e.g., as being a song title) with respect to the input of the designated command, the first natural language processing module 520 (e.g., the first domain classifier 630) of the electronic device 101 may ambiguously recognize an object to be played by the command among various objects, such as a TV program, a device, and/or music.

For example, the first domain classifier 630 of the first natural language processing module 520 may classify the domain of the command together with the confidence score (or confidence grade) (e.g., Confidence: 0.3) of the natural language processing result as "Device" corresponding to device control, but may transmit a request for natural language processing to the server 201 since the confidence score does not pass a reference value. According to an embodiment, the server 201 may identify that "Through the Night" is a song title through natural language processing based on data received from the electronic device 101 and may infer a more suitable result.

According to an embodiment, the data transmitted from the electronic device 101 to the server 201 may include the text (e.g., "Play Through the Night") corresponding to the user command, the classified domain (e.g., "Device" indicating a command related to device control), and the confidence score (e.g., Confidence: 0.3) of the result of natural language processing performed by the first domain classifier 630. According to an embodiment, the data transmitted from the electronic device 101 to the server 201 may also include a type of type data (e.g., Rejection Type) indicating a reason for which processing is not performed, the result (e.g., Preprocessing Data) of a preprocessing operation, and/or tokenized text (e.g., Tokenized Text). In an embodiment, the tokenized text may be included in the result (e.g., Preprocessing Data) of the preprocessing operation, is intended to make it easier to recognize a significant word or phrase in a subsequent inference operation of the server 201, and may include, for example, dividing a sentence in word units or dividing a plurality of sentences in individual sentence units. In an embodiment, the preprocessing operation may include, for example, lemmatization of changing 'has' to 'have' and stemming of finding a stem in addition to tokenization, and various preprocessing operations may be added and/or changed according to language characteristics.

Referring to FIG. 13, FIG. 13 illustrates an example of data transmitted from a first intent classifier 640 of the electronic device 101 to a second intent classifier 645 of the server 201.

According to an embodiment, FIG. 13 illustrates an example in which the electronic device 101 classifies a domain (e.g., 'MUSIC') corresponding to music and a domain (e.g., 'MOVIE') corresponding to a movie as a generic domain (e.g., a single domain as 'MEDIA') without division in a domain classification operation. For example, in FIG. 13, the first natural language processing module 520 of the electronic device 101 infers the 'MEDIA' domain but cannot identify the 'MOVIE' domain of a movie "Tenet", based on a command "Play Tenet".

According to an embodiment, as the electronic device 101 does not clearly distinguish between movie playback and music playback by natural language processing of the first natural language processing module 520, the first intent classifier 640 may ambiguously classify intent corresponding to user intent as "music playback". When the electronic device 101 can identify that the command is related to "MEDIA" playback through the first natural language processing module 520 but the confidence score of the natural language processing result is lower than a reference value, the electronic device 101 may transmit the result to the server 201 to more accurately process the user intent.

According to an embodiment, data transmitted from the electronic device 101 to the server 201 may include text (e.g., "Play Tenet") recognized by the electronic device 101, a domain (e.g., "MEDIA") indicating a command related to "MEDIA" playback, intent (e.g., "PlayMusic") indicating that the user intent is music playback, the confidence score (e.g., Confidence: 0.4) of the result of intent classification performed by the first intent classifier 640, and the result (e.g., Preprocessing Data) of a preprocessing operation performed by the first intent classifier 640. According to an embodiment, since the confidence score of the first intent classifier 640 of the first natural language processing module 520 does not pass the reference value, the electronic device 101 may transmit a request for natural language processing to the server 201. According to an embodiment, the server 201 may identify that the user intent is "movie playback" and "Tenet" is a movie title and may infer a more suitable result through natural language processing based on the data received from the electronic device 101.

Referring to FIG. 14, FIG. 14 illustrates an example of data transmitted from the first intent classifier 640 of the electronic device 101 to a second intent classifier 645 of the server 201. According to an embodiment, FIG. 14 illustrates an example in which history data (e.g., "ExecutionHistory") is further included in addition to the data illustrated in FIG. 13.

According to an embodiment, as illustrated in FIG. 14, a command "Play Bohemian Rhapsody" may be transmitted from the first natural language processing module 520 of the electronic device 101 to the server 201, and "Bohemian Rhapsody" may be processed, for example, as a generic domain (e.g., "MEDIA") including both a movie domain and a music domain, in which case the user intent may be ambiguously classified (e.g., as "PlayMusic"). When the user's previous command (e.g., "Find music") is identified based on the history data, the second intent classifier 645 of the server 201 may accurately infer that the user intent is intent relating to music playback.

According to an embodiment, as illustrated in FIG. 14, the history data according to the speech recognition execution history of the electronic device 101 may be transmitted at one time, at each speech recognition execution time, or in each predetermined period. In an embodiment, when the history data is transmitted at one time, a history (e.g., a user command) of successful processing by the electronic device 101 before a corresponding time may be included. In an embodiment, when the history data is transmitted at each speech recognition time or in each predetermined period, the history data may be transmitted to the server 201 whenever the electronic device 101 processes a user command, and a history (e.g., the user command) of successful processing by the electronic device 101 may be included in the history data. According to an embodiment, the execution history of the server 201 may also be shared with the electronic device 101, and the history data may be shared using a designated registry (e.g., cloud).

An electronic device according to various example embodiments of the disclosure may include: a communication module comprising communication circuitry, a microphone, a display module comprising a display, and a processor operatively connected to the communication module, the microphone, and the display module, wherein the processor may be configured to: receive a voice utterance through the microphone, perform speech recognition on the received voice using a natural language platform configured to process a command according to a voice, determine whether to process the command based on an interaction with a server while performing the speech recognition, generate intermediate data corresponding to a state in which the speech recognition is performed based on determining processing based on the interaction with the server, control the communication module to transmit the intermediate data to the server, receive a processing result of processing the command from the server based on the intermediate data, and to control the display module to display the processing result.

According to various example embodiments of the disclosure, the natural language platform may include: a speech recognition module (e.g., the first speech recognition module 510 of FIG. 5), a natural language processing module (e.g., the first natural language processing module 520 of FIG. 5), and a text-to-speech module (e.g., the first text-to-speech module 530 of FIG. 5), and the processor may be configured to process the command using each module of the speech recognition module, the natural language processing module, and the text-to-speech module.

According to various example embodiments of the disclosure, the processor may be configured to: generate the intermediate data corresponding to each of the speech recognition module, the natural language processing module, or the text-to-speech module, and request the server to process the command based on a module of the server corresponding to the intermediate data.

According to various example embodiments of the disclosure, the processor may be configured to: generate the intermediate data different for each module based on a characteristic of the speech recognition module, the natural language processing module, and the text-to-speech module.

According to various example embodiments of the disclosure, the processor may be configured to: perform automatic speech recognition (ASR) on audio data corresponding to the voice using the speech recognition module, and transmit first intermediate data related to the automatic speech recognition to the server based on the automatic speech recognition failing.

According to various example embodiments of the disclosure, the processor may be configured to: perform natural language processing based on a result of performing the automatic speech recognition using the natural language processing module based on the automatic speech recognition being successful, and transmit second intermediate data related to the natural language processing to the server based on the natural language processing failing.

According to various example embodiments of the disclosure, the processor may be configured to: perform text-to-speech conversion using the text-to-speech module based on the natural language processing being successful, and transmit third intermediate data related to text processing to the server based the text-to-speech conversion failing.

According to various example embodiments of the disclosure, the processor may be configured to: determine processing by the interaction with the server based on processing failing in the speech recognition module, the natural language processing module, or the text-to-speech module while performing the speech recognition, and request the server to process the command in continuation from where the processing fails.

According to various example embodiments of the disclosure, the processor may be configured to: determine an operation agent to provide the processing result, and provide a user interface including the processing result and information about the operation agent.

According to various example embodiments of the disclosure, the processor may be configured to: transmit audio data corresponding to the voice to the server based on receiving the voice, and determine compatibility between the electronic device and the server.

According to various example embodiments of the disclosure, the processor may be configured to: based on identifying a relationship between the voice and content stored in the electronic device, control the communication module to transmit content information including the relationship and information about the content along with the intermediate data to the server.

Hereinafter, an example operating method of an electronic device 101 according to various embodiments is described in greater detail. The following operations performed by the electronic device 101 according to various embodiments may be executed by a processor 120 including at least one processing circuit. According to an embodiment, the operations performed by the electronic device 101 may be executed by instructions that are stored in a memory 130 and which, when executed, cause the processor 120 to operate.

Figure 15:
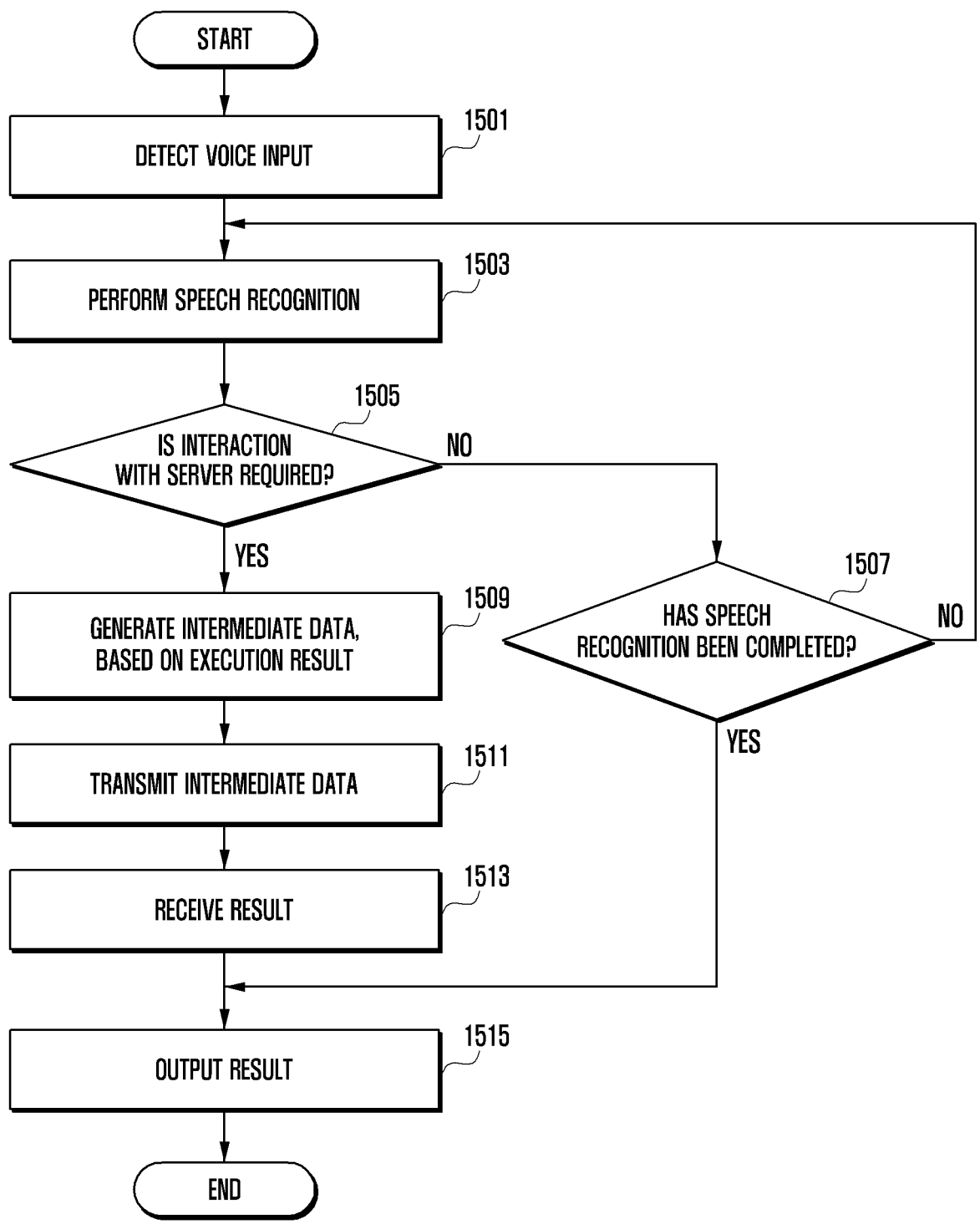
FIG. 15 is a flowchart illustrating an example method of operating an electronic device according to various embodiments.

FIG. 15 is a flowchart illustrating an example method of operating an electronic device according to various embodiments.

Referring to FIG. 15, in operation 1501, a processor 120 of an electronic device 101 may detect a voice input. According to an embodiment, the processor 120 may receive a voice signal (or audio data) corresponding to a user utterance input through a microphone 151 of the electronic device 101. According to an embodiment, the processor 120 may further include an operation of transmitting the audio data corresponding to the voice input to a server 201. For example, the processor 120 may perform an operation of transmitting the audio data to the server 201 by further including information about whether the audio data is the last data therein.

In operation 1503, the processor 120 may perform speech recognition. According to an embodiment, the processor 120 may sequentially perform operations for processing a user command, such as converting the audio data related to the received voice input into text data, determining user intent through natural language processing based on the text data, and/or text-to-speech conversion of data related to the user intent.

In operation 1505, the processor 120 may determine whether an interaction with the server 201 is required. According to an embodiment, the processor 120 may perform speech recognition for processing the user command by each module (e.g., a first speech recognition module 510, a first natural language processing module 520, and a first text-to-speech module 530) for an intelligent service, and may determine the interaction with the server 201 when processing is impossible (or fails) in any module during the speech recognition.

When no interaction with the server 201 is required in operation 1505 (e.g., 'No' in operation 1505), for example, when processing is possible (or does not fail) during the speech recognition, the processor 120 may determine whether the speech recognition has been completed in operation 1507.

When the speech recognition has not been completed in operation 1507 (e.g., 'No' in operation 1507), the processor 120 may proceed to operation 1503 and may perform operation 1503 and subsequent operations.

When the speech recognition has been completed in operation 1507 (e.g., 'Yes' in operation 1507), in operation 1515, the processor 120 may output the processing result of performing the speech recognition. According to an embodiment, the processor 120 may output information about the processing result as auditory and/or visual information through a speaker 155 and/or a display module 160.

When the interaction with the server 201 is required in operation 1505 (e.g., 'Yes' in operation 1505), for example, when processing is impossible (or fails) in a specified module during the speech recognition, the processor 120 may generate intermediate data, based on an execution result in operation 1509. According to an embodiment, the processor 120 may generate the intermediate data (e.g., first intermediate data, second intermediate data, or third intermediate data) corresponding to the execution result obtained by processing by modules until processing is impossible during the speech recognition.

In operation 1511, the processor 120 may transmit the intermediate data to the server 201 using a communication module 190. For example, when processing by a part of the server 201 is required while processing the user command, the processor 120 may transmit a request to the server 201 so that processing is continued in a module of the server 201 corresponding to a corresponding module of the electronic device 101, based on the intermediate data.

In operation 1513, the processor 120 may receive the processing result of the user command from the server 201 through the communication module 190.

In operation 1515, the processor 120 may output the processing result received from the server 201. According to an embodiment, the processor 120 may output information about the processing result as auditory and/or visual information through the speaker 155 and/or the display module 160.

Figure 16:
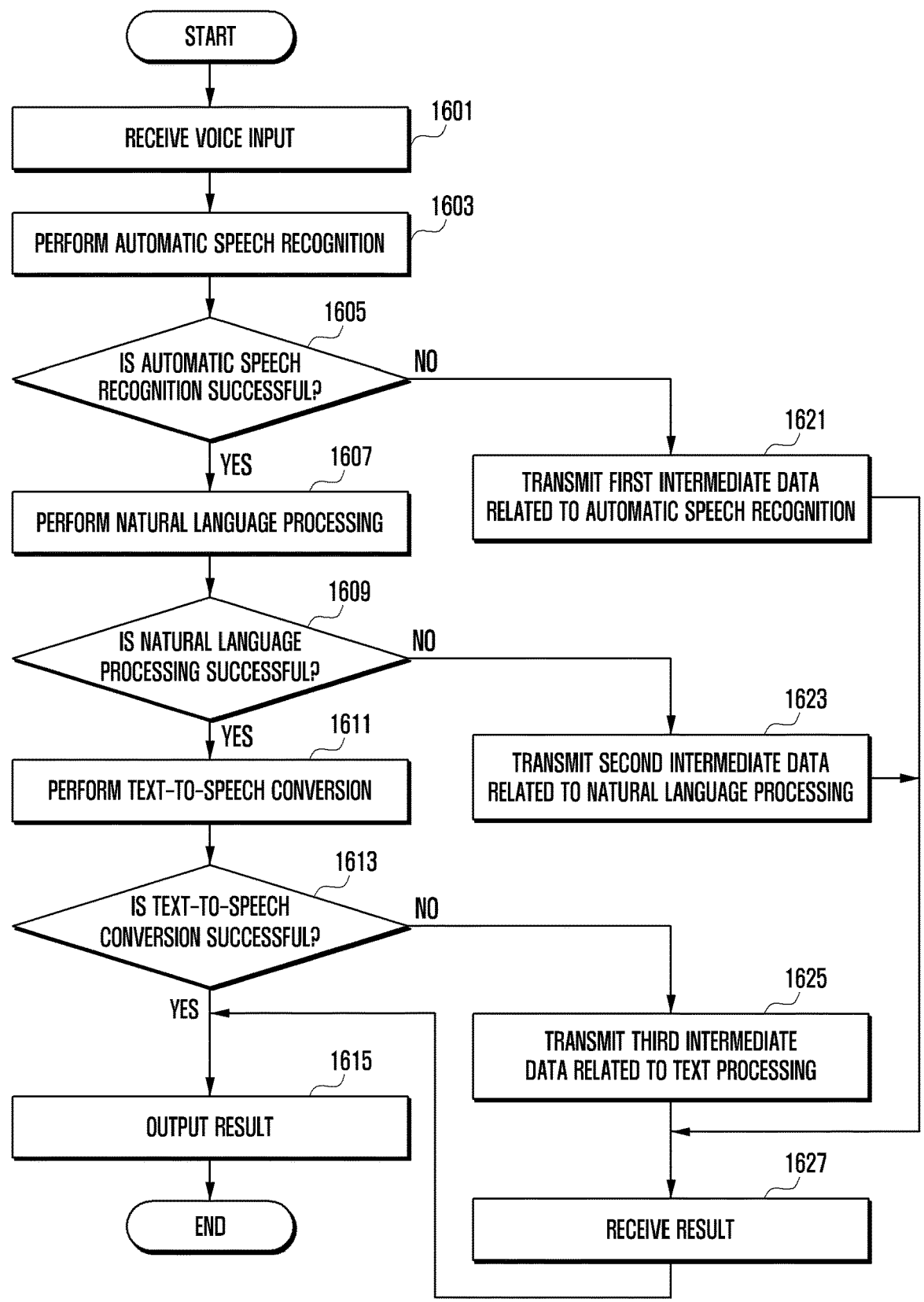
FIG. 16 is a flowchart illustrating an example method of operating an electronic device in which an electronic device processes a user command by each module according to various embodiments.

FIG. 16 is a flowchart illustrating an example method of operation an electronic device in which an electronic device processes a user command by each module according to various embodiments.

According to an embodiment, an electronic device 101 may include a speech recognition module (e.g., the first speech recognition module 510 of FIG. 5 to FIG. 7), a natural language processing module (e.g., the first natural language processing module 520 of FIG. 5 to FIG. 7), and a text-to-speech module (e.g., the first text-to-speech module 530 of FIG. 5 to FIG. 7) for an intelligent service, and may process a user command by each module or may provide intermediate data corresponding to each module to a server 201 so that the user command is continuously processed by the server 201.

Referring to FIG. 16, in operation 1601, a processor 120 of the electronic device 101 may receive a voice input. According to an embodiment, the processor 120 may receive a voice signal (or audio data) corresponding to a user utterance input through a microphone 151 of the electronic device 101. According to an embodiment, the processor 120 may further include an operation of transmitting the audio data corresponding to the voice input to a server 201.

In operation 1603, the processor 120 may perform automatic speech recognition (ASR). According to an embodiment, the processor 120 may perform automatic speech recognition on the audio data corresponding to the voice input using the speech recognition module (e.g., the first speech recognition module 510 of FIG. 5 to FIG. 7).

In operation 1605, the processor 120 may determine whether the automatic speech recognition is successful. According to an embodiment, the processor 120 may determine whether the automatic speech recognition is successful in the first speech recognition module 510.

When the automatic speech recognition fails (or is not successful) in operation 1605 (e.g., 'No' in operation 1605), the processor 120 may transmit first intermediate data related to the automatic speech recognition to the server 201 in operation 1621. According to an embodiment, when the processor 120 cannot perform the automatic speech recognition (e.g., conversion into text data) on the voice input, the processor 120 may transmit the first intermediate data to the server 201 through a communication module 190 so that a speech recognition module (e.g., the second speech recognition module 515 of FIG. 5 to FIG. 7) of the server 201 performs automatic speech recognition corresponding to the voice input. According to an embodiment, the first intermediate data may include, for example, information about whether speech recognition is rejected (e.g., eASR rejection), a speech recognition result, a speech recognition score, and/or a domain.

According to an embodiment, the server 201 may receive the first intermediate data from the electronic device 101, and may convert the voice input into text data using the second speech recognition module 515 corresponding to the first speech recognition module 510 of the electronic device 101, based on the first intermediate data. According to an embodiment, the server 201 may process a user command related to the voice input through the second speech recognition module 515, a second natural language processing module 525, and a second text-to-speech module 535 following processing by the first speech recognition module 510 of the electronic device 101 and may transmit a processing result to the electronic device 101. According to an embodiment, the processor 120 may receive the result from the server 201 through the communication module 190 in operation 1627 and may output the received result in operation 1615.

When the automatic speech recognition is successful in operation 1605 (e.g., 'Yes' in operation 1605), the processor 120 may perform natural language processing in operation 1607. According to an embodiment, the processor 120 may determine user intent using the text data of the voice input using the natural language processing module (e.g., the first natural language processing module 520 of FIG. 5 to FIG. 7). According to an embodiment, after performing the automatic speech recognition in the first speech recognition module 510 according to operation 1603 and operation 1605, the processor 120 may determine whether natural language processing needs to be performed in the server 201. According to an embodiment, when the processor 120 determines to transfer natural language processing to the server 201 according to a determination result, the processor 120 may transmit the first intermediate data to the server 201, thereby requesting the natural language processing module (e.g., the second natural language processing module 525 of FIG. 5 to FIG. 7) of the server 201 to perform natural language processing, in which case operation 1607, operation 1609, operation 1611, and/or operation 1613 may not be performed.

In operation 1609, the processor 120 may determine whether the natural language processing is successful.

According to an embodiment, the processor 120 may determine whether the user intent can be identified in the first natural language processing module 520 using the text data.

When the natural language processing fails (e.g., is not successful) in operation 1609 (e.g., 'No' in operation 1609), the processor 120 may transmit second intermediate data related to the natural language processing to the server 201 in operation 1623. According to an embodiment, when the processor 120 cannot perform the natural language processing (e.g., user intent determination) using the text data, the processor 120 may transmit the second intermediate data to the server 201 through the communication module 190 so that the second natural language processing module 525 of the server 201 performs natural language processing. According to an embodiment, the second intermediate data may include various information, for example, whether user intent identification is rejected (e.g., eNLU rejection), a user intent identification result, text (or tokenized text), context information (e.g., execution status information and execution history information), domain information, intent information, and/or slot information.

According to an embodiment, the server 201 may receive the second intermediate data from the electronic device 101 and may determine user intent in the text data using the second natural language processing module 525 of the server 201 corresponding to the first natural language processing module 520 of the electronic device 101, based on the second intermediate data. According to an embodiment, the server 201 may process the user command related to the voice input through the second natural language processing module 525 and the second text-to-speech module 535 following processing by the first speech recognition module 510 of the electronic device 101 and may transmit a processing result to the electronic device 101. According to an embodiment, the processor 120 may receive the result from the server 201 through the communication module 190 in operation 1627 and may output the received result in operation 1615.

When the natural language processing is successful in operation 1609 (e.g., 'Yes' in operation 1609), the processor 120 may convert text into a voice (e.g., text-to-speech conversion) in operation 1611. According to an embodiment, the processor 120 may convert information in a text form into information in a voice form using the text-to-speech module (e.g., the first text-to-speech module 530 of FIG. 5 to FIG. 7).

In operation 1613, the processor 120 may determine whether text conversion is successful. According to an embodiment, the processor 120 may determine whether the text-to-speech conversion using the text corresponding to the user intent is possible in the first text-to-speech module 530.

When the text-to-speech conversion fails (e.g., is not successful) in operation 1613 (e.g., 'No' in operation 1613), the processor 120 may transmit third intermediate data related to text processing to the server 201 in operation 1625. According to an embodiment, when the processor 120 cannot perform the text-to-speech conversion using the text corresponding to the user intent, the processor 120 may transmit the third intermediate data to the server 201 through the communication module 190 so that the text-to-speech module (e.g., the second text-to-speech module 535 of FIG. 5 to FIG. 7) of the server 201 performs text-to-speech conversion based on the text. According to an embodiment, the third intermediate data may include information, for example, whether text-to-speech conversion is rejected (e.g., eTTS rejection), a text-to-speech conversion result, and/or text. According to an embodiment, the server 201 may receive the third intermediate data from the electronic device 101 and may perform text-to-speech conversion using the second text-to-speech module 535 of the server 201 corresponding to the first text-to-speech module 530 of the electronic device 101, based on the third intermediate data. According to an embodiment, the server 201 may process the user command related to the voice input through the second text-to-speech module 535 following processing by the first text-to-speech module 530 of the electronic device 101 and may transmit a processing result to the electronic device 101. According to an embodiment, the processor 120 may receive the result from the server 201 through the communication module 190 in operation 1627 and may output the received result in operation 1615.

When the text conversion is successful in operation 1613 (e.g., 'Yes' in operation 1613), the processor 120 may output the processing result of the user command related to the voice input in operation 1615. According to an embodiment, the processor 120 may output information related to the processing result as auditory and/or visual information through the speaker 155 and/or the display module 160.

Figure 17:
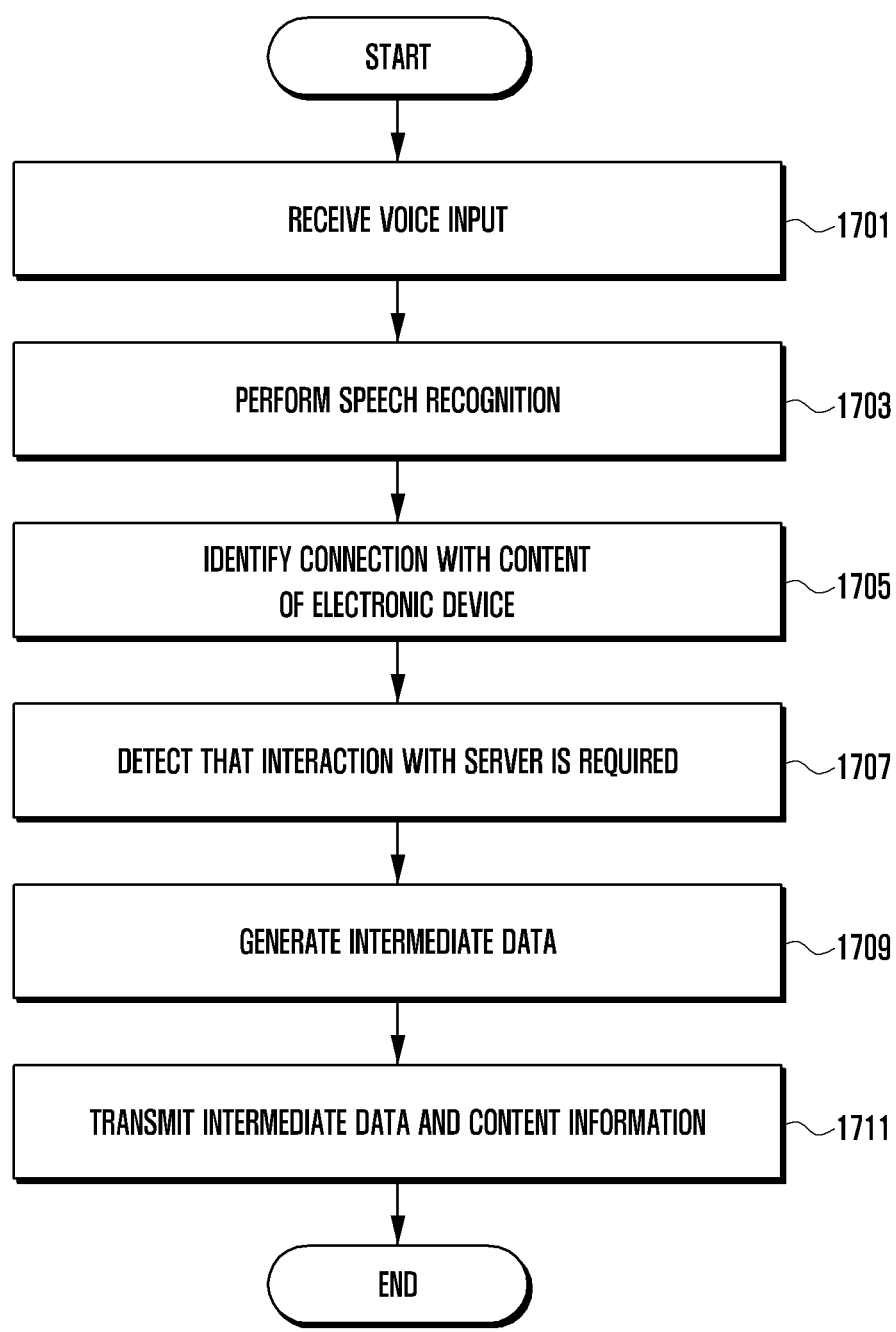
FIG. 17 is a flowchart illustrating an example voice processing operation of an electronic device according to various embodiments.

FIG. 17 is a flowchart illustrating an example voice processing operation of an electronic device according to various embodiments.

According to an embodiment, when content information (or personal information) about an electronic device 101 is utilized in an intelligent service, a server 201 may more accurately process and perform a user command. For example, when the electronic device 101 can identify in a speech recognition module whether a word uttered by a user corresponds to at least one of pieces of content (e.g., pieces of contact information, photos, and/or applications) stored in the electronic device 101, the server 201 may more accurately convert a voice input from the user into text, thereby increasing accuracy in understanding (or determining) user intent. For example, content information of the electronic device 101 may be included in intermediate data transmitted from the electronic device 101 to the server 201. For example, assuming that a user utterance is "Call Gil-Dong Hong!", the electronic device 101 may also transmit information indicating that the word "Gil-Dong Hong" is content information (e.g., contact information) stored in the electronic device 101. Accordingly, the server 201 may omit a content information matching operation, and it is possible to enhance security of the content information and to save resources required for content information management. FIG. 17 illustrates an operating method of the electronic device 101 in which content information is provided together with intermediate data.

Referring to FIG. 17, in operation 1701, a processor 120 of the electronic device 101 may receive a voice input. According to an embodiment, the processor 120 may receive a voice signal (or audio data) corresponding to a user utterance input through a microphone 151 of the electronic device 101.

In operation 1703, the processor 120 may perform speech recognition. According to an embodiment, the processor 120 may sequentially perform operations for processing a user command, such as converting the data related to the received voice input into text data, determining user intent through natural language processing based on the text data, and/or text-to-speech conversion of data related to the user intent.

In operation 1705, the processor 120 may identify whether the voice input has a connection with content of the electronic device 101. According to an embodiment, while performing the speech recognition, the processor 120 may identify whether the voice input according to the user utterance is related to content (e.g., contact information, a photo, and/or an application) stored (or installed) in the electronic device 101. According to an embodiment, when the processor 120 determines that the voice input is related to the content of the electronic device 101, the processor 120 may include an operation of generating content information (or personal information) including the connection (e.g., whether the voice input is related) and information about the content.

In operation 1707, the processor 120 may detect that an interaction with the server 201 is required. According to an embodiment, the processor 120 may perform speech recognition for processing the user command by each module (e.g., a first speech recognition module 510, a first natural language processing module 520, and a first text-to-speech module 530) for an intelligent service, and may determine the interaction with the server 201 when processing is impossible (or fails) in any module during the speech recognition.

In operation 1709, the processor 120 may generate intermediate data. According to an embodiment, when the interaction with the server 201 is required, the processor 120 may generate the intermediate data (e.g., first intermediate data, second intermediate data, or third intermediate data) corresponding to an execution result obtained by processing by corresponding modules until processing is impossible. According to an embodiment, when generating the intermediate data, the processor 120 may include the content information in the intermediate data.

In operation 1711, the processor 120 may transmit the intermediate data and the content information to the server 201 using a communication module 190. For example, when processing by a part of the server 201 is required while processing the user command, the processor 120 may transmit a request to the server 201 so that processing is continued in a module of the server 201 corresponding to a corresponding module of the electronic device 101, based on the intermediate data, and may also provide the related content information.

Figure 18:
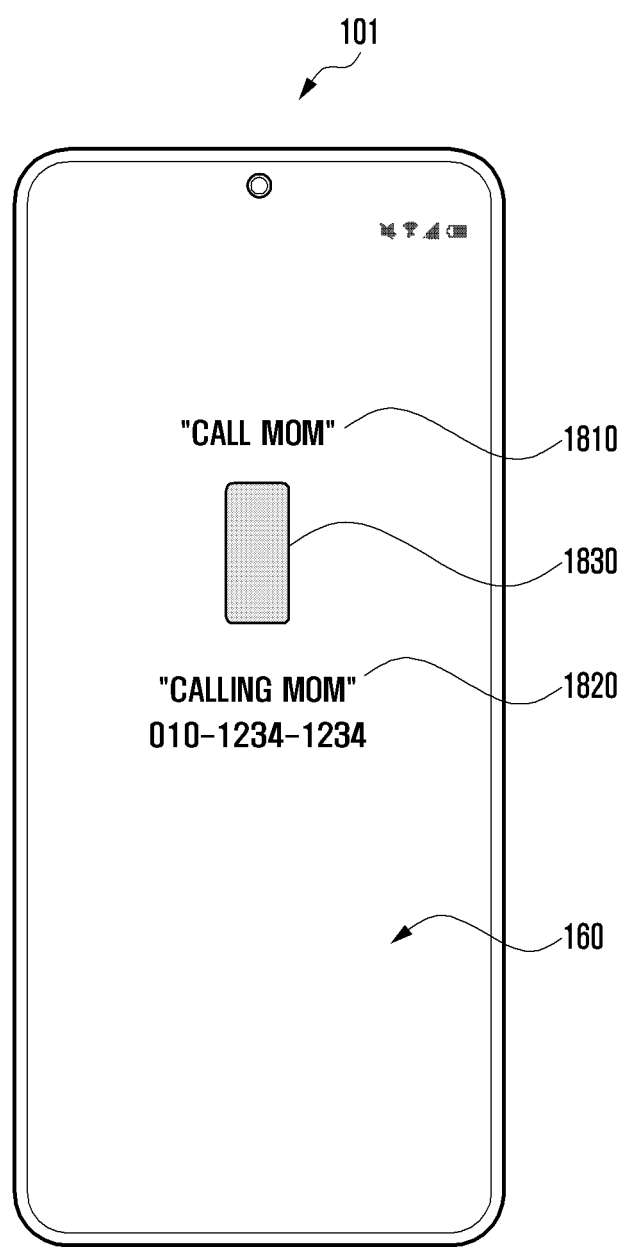
FIG. 18 and FIG. 19 are diagrams illustrating examples of a user interface provided by an electronic device according to various embodiments.
Figure 19:
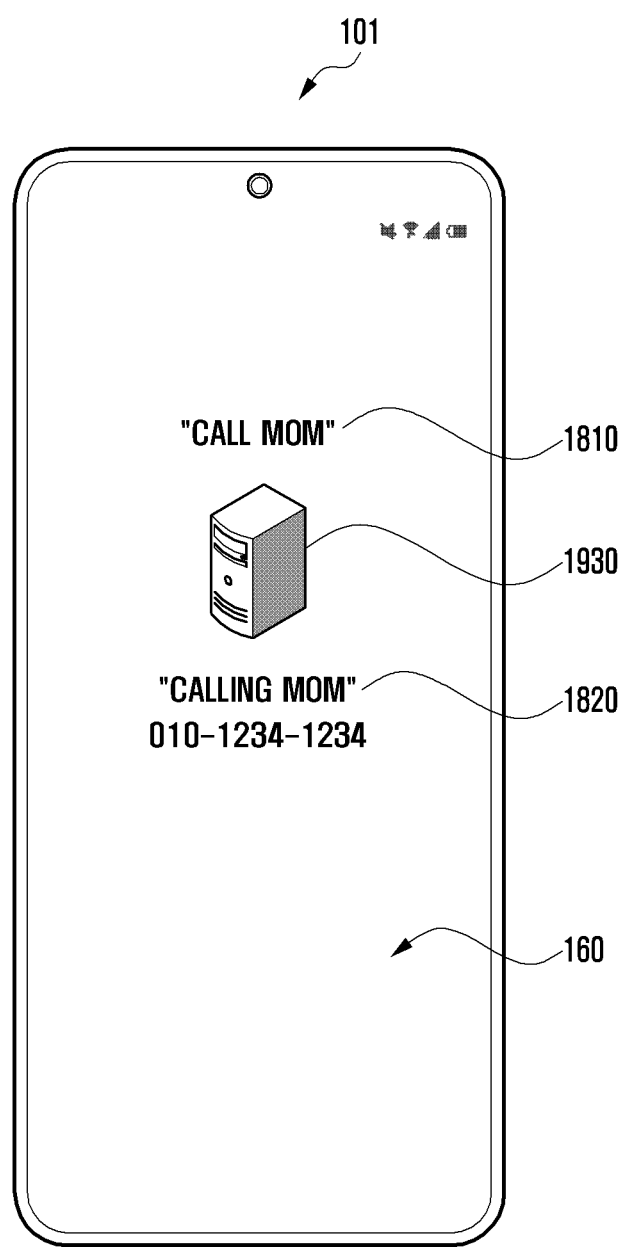

FIG. 18 and FIG. 19 are diagrams illustrating examples of a user interface provided by an electronic device according to various embodiments.

According to an embodiment, FIG. 18 and FIG. 19 illustrate examples of a user interface including information about an operation agent (or processing agent) providing the processing result of a user command when the processing result is provided to a user.

According to an embodiment, FIG. 18 illustrates an example of a first user interface (e.g., an illustrative screen) that may be provided when a user command is processed by an electronic device 101. According to an embodiment, FIG. 19 illustrates an example of a second user interface (e.g., an illustrative screen) that may be provided when a user command is processed by a server 201.

Referring to FIG. 18 and FIG. 19, the first user interface and the second user interface may include at least one object (e.g., a first object 1810 and/or a second object 1820) related to the processing result of the user command and at least one object (e.g., a third object 1830 or a fourth object 1930) related to an agent (e.g., the electronic device 101 or the server 201) processing the user command.

According to an embodiment, the first object 1810 may include information (e.g., user utterance information) obtained by automatic speech recognition of the user command and conversion of the user command into text data. According to an embodiment, the second object 1820 may include information related to an operation to be performed based on the result of processing the user command. According to an embodiment, when providing the processing result (e.g., the first object 1810 and/or the second object 1820) corresponding to the user command, the electronic device 101 may determine whether to perform the user command in the electronic device 101 or the server 201, and may display the first user interface or the second user interface on a display module 160 to be provided for the user, based on a determination result.

For example, when the user command is processed in the electronic device 101, the electronic device 101 may provide the first user interface in which a third object 1830 (e.g., an image (or icon) and/or text for identifying the electronic device 101) indicating that the processing agent is the electronic device 101 is included in the processing result (e.g., the first object 1810 and/or the second object 1820). In another example, when the user command is processed in the server 201, the electronic device 101 may provide the second user interface in which a fourth object 1930 (e.g., an image (or icon) and/or text for identifying the server 201) indicating that the processing agent is the server 201 is included in the processing result (e.g., the first object 1810 and/or the second object 1820).

According to an embodiment, the information about the processing agent of the user command may be provided via different user interfaces including the information (e.g., the third object 1830 or the fourth object 1930) about the processing agent as illustrated in FIG. 18 or FIG. 19 or may be provided via a user interface including only information about the processing result (e.g., the first object 1810 and/or the second object 1820) rather than including the information about the processing agent according to the configuration of the electronic device 101 by the user.

Figure 20:
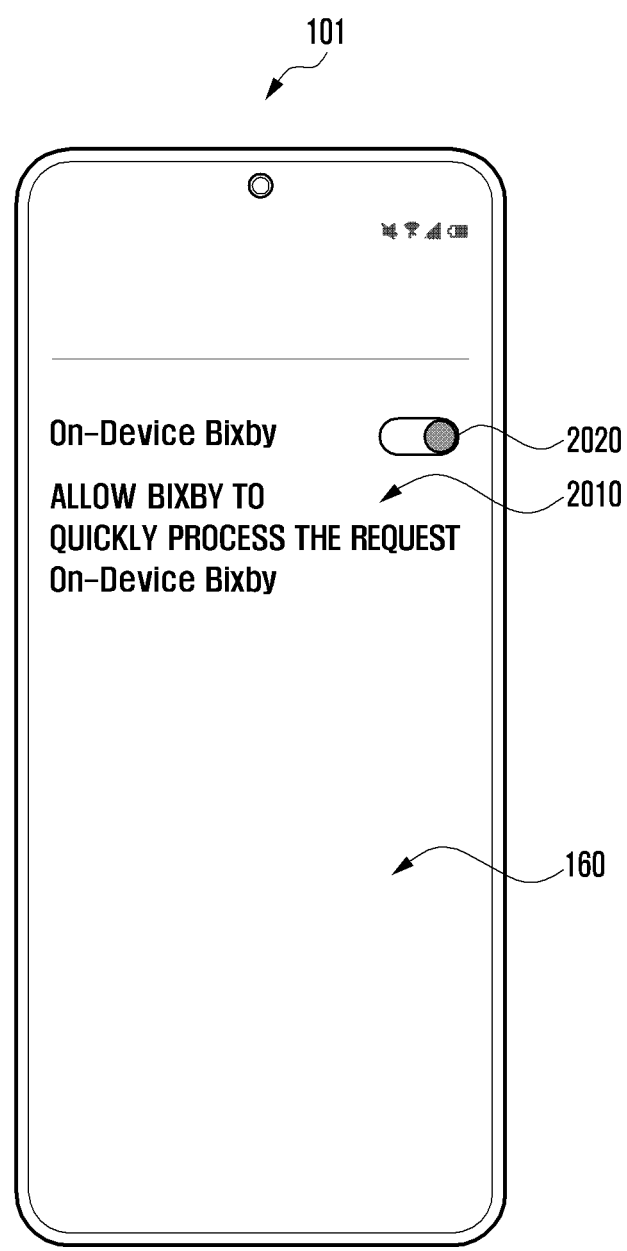
FIG. 20 is a diagram illustrating an example of a user interface provided by an electronic device according to various embodiments.

FIG. 20 is a diagram illustrating an example of a user interface provided by an electronic device according to various embodiments.

According to an embodiment, FIG. 20 illustrates an example of a user interface for configuring an operation agent (or whether to interact with a server 201) with respect to a user command.

FIG. 20 illustrates an example of a user interface (e.g., an illustrative screen) for configuring whether to process a user command in an electronic device 101 or to process the user command by an interaction with the server 201.

Referring to FIG. 20, a user may configure whether to process the user command in the electronic device 101 through the user interface. For example, the user interface may include an object 2010 (e.g., text information) for a guide to a processing method for the user command and an object 2020 (e.g., a configuring button) for configuring activation or deactivation of a corresponding option. According to an embodiment, the user may configure whether to process the user command in the electronic device 101 or the server 201 through option configuration (e.g., activation or deactivation configuration) by selection of the object 2020.

For example, when the option is deactivated, the user command may always be processed by the server 201 instead of starting to process the user command in the electronic device 101. In another example, when the option is activated, the user command may start to be processed in the electronic device 101, and may be processed by an interaction with the server 201 if necessary. Additionally or alternatively, since processing by the electronic device 101 may be continuously performed by the server 201, the user interface may further include an option configuration for allowing processing to be performed in the electronic device 101 only up to a designated module of the electronic device 101. For example, to block transmission of a user voice to the server 201, the user may configure processing to be performed in the electronic device 101 up to an automatic speech recognition operation and may configure subsequent operations to be performed in the server 201.

An operating method performed by an electronic device according to various embodiments of the disclosure may include: receiving a voice utterance through a microphone, performing speech recognition on the received voice using a natural language platform for processing a command according to a voice, determining whether to process the command based on an interaction with a server while performing the speech recognition, generating intermediate data corresponding to a state in which the speech recognition is performed upon determining processing based on the interaction with the server, transmitting the intermediate data to the server through a communication module, receiving a processing result of processing the command from the server based on the intermediate data, and displaying the processing result through a display module.

According to various example embodiments of the disclosure, the natural language platform may include: a speech recognition module (e.g., the first speech recognition module 510 of FIG. 5), a natural language processing module (e.g., the first natural language processing module 520 of FIG. 5), and a text-to-speech module (e.g., the first text-to-speech module 530 of FIG. 5), and the performing of the speech recognition may include: processing the command by each module of the speech recognition module, the natural language processing module, and the text-to-speech module.

According to various example embodiments of the disclosure, the generating and transmitting of the intermediate data may include: generating the intermediate data corresponding to each of the speech recognition module, the natural language processing module, or the text-to-speech module, and requesting the server to process the command based on a module of the server corresponding to the intermediate data.

According to various example embodiments of the disclosure, the generating of the intermediate data may include: generating intermediate data different for each module based on a characteristic of the speech recognition module, the natural language processing module, and the text-to-speech module.

According to various example embodiments of the disclosure, the transmitting of the intermediate data may include: performing automatic speech recognition (ASR) on audio data corresponding to the voice using the speech recognition module, and transmitting first intermediate data related to the automatic speech recognition to the server based on the automatic speech recognition failing.

According to various example embodiments of the disclosure, the transmitting of the intermediate data may include: performing natural language processing based on a result of performing the automatic speech recognition, using the natural language processing module based on the automatic speech recognition being successful, and transmitting second intermediate data related to the natural language processing to the server based on the natural language processing failing.

According to various example embodiments of the disclosure, the transmitting of the intermediate data may include: performing text-to-speech conversion using the text-to-speech module based on the natural language processing being successful, and transmitting third intermediate data related to text processing to the server based on the text-to-speech conversion failing.

According to various example embodiments of the disclosure, the determining whether to process the command may include: determining processing by the interaction with the server based on processing failing in the speech recognition module, the natural language processing module, or the text-to-speech module while performing the speech recognition, and requesting the server to process the command in continuation from where the processing fails.

According to various example embodiments of the disclosure, the displaying of the processing result may include: determining an operation agent to provide the processing result and providing a user interface including the processing result and information about the operation agent.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a communication circuitry;
a microphone;
a display;
at least one processor comprising processing circuitry and operatively connected to the communication circuitry, the microphone, and the display; and
memory storing instructions which, when executed by the at least one processor, cause the electronic device to perform operations comprising:
receiving a voice utterance through the microphone,
providing the received voice utterance to a first natural language platform, comprising a plurality of processing modules, for performing speech recognition to process a command corresponding to the received voice utterance,
determining whether a failure occurs in processing the command in the performing of the speech recognition,
based on determining no occurrence of a failure, continuously performing speech recognition for processing the command using the first natural language platform of the electronic device,
based on determining an occurrence of a failure,
identify a result of determining compatibility between the electronic device and a server comprising a second natural language platform for the server to process intermediate data generated by the electronic device, based on an exchange of compatibility-related information between the electronic device and the server;
based on identifying a result of compatibility between the electronic device and the server, generating the intermediate data corresponding to a portion of the command processed by a processing module of the plurality of processing modules until the determined occurrence, controlling the communication circuitry to transmit the intermediate data to the server for continuously processing the command from the portion of the command by a processing module of the second natural language platform corresponding to the processing module of the first natural language platform associated with the determined occurrence, and based on identifying a result of non-compatibility between the electronic device and the server, controlling the communication circuitry to transmit the voice utterance to the server for processing, receiving a processing result of the command from the server, and controlling the display to display the processing result.

2. The electronic device of claim 1, wherein the processing modules of the first natural language platform comprise a speech recognition module, a natural language processing module, and a text-to-speech (TTS) module, and wherein memory stores instructions which, when executed, cause the electronic device to perform operations comprising sequentially processing the command using the speech recognition module, the natural language processing module, and the TTS module.

3. The electronic device of claim 2, wherein the intermediate data is related to one of the speech recognition module, the natural language processing module, or the TTS module.

4. The electronic device of claim 3, wherein the intermediate data is different for each respective processing module based on a characteristic of the respective processing module.

5. The electronic device of claim 2, wherein memory stores instructions which, when executed, cause the electronic device to perform operations comprising:

performing automatic speech recognition (ASR) on audio data corresponding to the voice utterance using the speech recognition module, controlling the communication circuitry to transmit first intermediate data related to the ASR to the server based on occurrence of a failure for the ASR, performing natural language processing (NLP) based on a result of the ASR, using the NLP module based on identifying no occurrence of a failure for the ASR, and controlling the communication circuitry to transmit second intermediate data related to the NLP to the server based on occurrence of a failure for the NLP.

6. The electronic device of claim 5, wherein memory stores instructions which, when executed, cause the electronic device to perform operations comprising:

performing TTS conversion using the TTS module based on no occurrence of a failure for the NLP, and controlling the communication circuitry to transmit third intermediate data related to the TTS conversion to the server based on occurrence of a failure for the TTS conversion.

7. The electronic device of claim 1, wherein memory stores instructions which, when executed, cause the electronic device to perform operations comprising:

determining an operation agent to provide the processing result, and providing a user interface comprising the processing result and information about the operation agent.

8. The electronic device of claim 1, wherein memory stores instructions which, when executed, cause the electronic device to perform operations comprising:

based on identifying a relationship between the voice utterance and content stored in the electronic device, controlling the communication circuitry to transmit content information comprising the relationship and information about the content and the intermediate data to the server.

9. A method of operating an electronic device, the method comprising:

receiving a voice utterance through a microphone;

providing the received voice utterance to a first natural language platform, comprising a plurality of processing modules, for performing speech recognition to process a command corresponding to the received voice utterance;

determining whether a failure occurs in processing the command in the performing of the speech recognition;

based on determining no occurrence of a failure, continuously performing speech recognition for processing the command using the first natural language platform of the electronic device;

based on determining an occurrence of a failure, identifying a result of determining compatibility between the electronic device and a server comprising a second natural language platform for the server to process intermediate data generated by the electronic device, based on an exchange of compatibility-related information between the electronic device and the server;

based on identifying a result of compatibility between the electronic device and the server, generating the intermediate data corresponding to a portion of the command processed by a processing module of the plurality of processing modules until the determined occurrence, and transmitting the intermediate data to the server for continuously processing the command from the portion of the command by a processing module of the second natural language platform corresponding to the processing module of the first natural language platform associated with the determined occurrence through communication circuitry; and based on identifying a result of non-compatibility between the electronic device and the server, controlling the communication circuitry to transmit the voice utterance to the server for processing, receiving a processing result of the command from the server; and displaying the processing result through a display.

10. The method of claim 9, wherein the processing modules of the first natural language platform comprise a speech recognition module, a natural language processing module, and a text-to-speech (TTS) module, and wherein the method comprises sequentially processing the command using the speech recognition module, the natural language processing module, and the TTS module.

11. The method of claim 10, wherein the intermediate data is related to one of the speech recognition module, the natural language processing module, or the TTS module, and wherein the intermediate data is different for each respective processing module based on a characteristic of the respective processing module.

12. The method of claim 10, comprising:

performing automatic speech recognition (ASR) on audio data corresponding to the voice utterance using the speech recognition module, transmitting first intermediate data related to the ASR to the server based on occurrence of a failure for the ASR, performing natural language processing (NLP) based on a result of the ASR using the NLP module based on identifying no occurrence of a failure for the ASR, transmitting second intermediate data related to the NLP to the server based on occurrence of a failure for the NLP, performing TTS conversion using the TTS module based on no occurrence of a failure for the NLP, and transmitting third intermediate data related to the TTS conversion to the server based on occurrence of a failure for the TTS conversion.

13. A non-transitory computer-readable recording medium storing a program which, when executed, causes an electronic device to perform operations comprising:

receiving a voice utterance through a microphone;

providing the received voice utterance to a first natural language platform, comprising a plurality of processing modules, for performing speech recognition to process a command corresponding to the received voice utterance;

determining whether a failure occurs in processing the command in the performing of the speech recognition;

based on determining no occurrence of a failure, continuously performing speech recognition for processing the command using the first natural language platform of the electronic device;

based on determining an occurrence of a failure, identifying a result of determining compatibility between the electronic device and a server comprising a second natural language platform for the server to process intermediate data generated by the electronic device, based on an exchange of compatibility-related information between the electronic device and the server;

based on identifying a result of compatibility between the electronic device and the server, generating intermediate data corresponding to a portion of the command processed by a processing module of the plurality of processing modules until the determined occurrence, and transmitting the intermediate data to the server for continuously processing the command from the portion of the command by a processing module of the second natural language platform corresponding to the processing module of the first natural language platform associated with the determined occurrence through communication circuitry; and based on identifying a result of non-compatibility between the electronic device and the server, controlling the communication circuitry to transmit the voice utterance to the server for processing, receiving a processing result of the command from the server; and displaying the processing result through a display.

14. An electronic device comprising the non-transitory computer-readable recording medium of claim 13.

15. The electronic device of claim 1, wherein the compatibility-related information comprises version information.

16. The method of claim 9, wherein the compatibility-related information comprises version information.

17. The non-transitory computer-readable recording medium of claim 13, wherein the compatibility-related information comprises version information.

\* \* \* \* \*